(12) United States Patent
Bazlamacci et al.

(10) Patent No.: US 8,724,624 B2
(45) Date of Patent: May 13, 2014

(54) SYSTOLIC ARRAY ARCHITECTURE FOR FAST IP LOOKUP

(76) Inventors: Cuneyt Bazlamacci, Ankara (TR); Oguzhan Erdem, Ankara (TR)

(*) Notice: Subject to any disclaimer, the term of this patent is extended or adjusted under 35 U.S.C. 154(b) by 95 days.

(21) Appl. No.: 13/518,390

(22) PCT Filed: Dec. 22, 2009

(86) PCT No.: PCT/TR2009/000157
§ 371 (c)(1),
(2), (4) Date: Jun. 22, 2012

(87) PCT Pub. No.: WO2011/078812
PCT Pub. Date: Jun. 30, 2011

(65) Prior Publication Data
US 2012/0257506 A1    Oct. 11, 2012

(51) Int. Cl.
*H04L 12/28* (2006.01)
*H04L 12/66* (2006.01)
*H04L 12/54* (2013.01)
*H04L 12/56* (2006.01)

(52) U.S. Cl.
CPC .............. *H04L 12/66* (2013.01); *H04L 12/56* (2013.01); *H04L 45/54* (2013.01)
USPC ............ 370/389; 370/401; 370/395.31

(58) Field of Classification Search
CPC .......... H04L 12/66; H04L 12/56; H04L 45/54
USPC ............ 370/389, 351, 252, 401, 402, 395.32, 370/395.31, 400, 229
See application file for complete search history.

(56) References Cited

U.S. PATENT DOCUMENTS

| | | | |
|---|---|---|---|
| 6,581,106 B1 * | 6/2003 | Crescenzi et al. | 709/242 |
| 6,711,153 B1 * | 3/2004 | Hebb et al. | 370/351 |
| 7,031,320 B2 * | 4/2006 | Choe | 370/395.31 |
| 8,477,780 B2 * | 7/2013 | Schultz | 370/392 |
| 2011/0128959 A1 * | 6/2011 | Bando et al. | 370/392 |

* cited by examiner

*Primary Examiner* — Brenda H Pham
(74) *Attorney, Agent, or Firm* — Gokalp Bayramoglu

(57) ABSTRACT

This invention first presents SRAM based pipeline IP lookup architectures including an SRAM based systolic array architecture that utilizes multi-pipeline parallelism idea and elaborates on it as the base architecture highlighting its advantages. In this base architecture a multitude of intersecting and different length pipelines are constructed on a two dimensional array of processing elements in a circular fashion. The architecture supports the use of any type of prefix tree instead of conventional binary prefix tree. The invention secondly proposes a novel use of an alternative and more advantageous prefix tree based on binomial spanning tree to achieve a substantial performance increase. The new approach, enhanced with other extensions including four-side input and three-pointer implementations, considerably increases the parallelism and search capability of the base architecture and provides a much higher throughput than all existing IP lookup approaches making, for example, a 7 Tbps router IP lookup front end speed possible. Although theoretical worst-case lookup delay in this systolic array structure is high, the average delay is quite low, large delays being observed only rarely. The structure in its new form is scalable in terms of processing elements and is also well suited for the IPv6 addressing scheme.

5 Claims, 15 Drawing Sheets

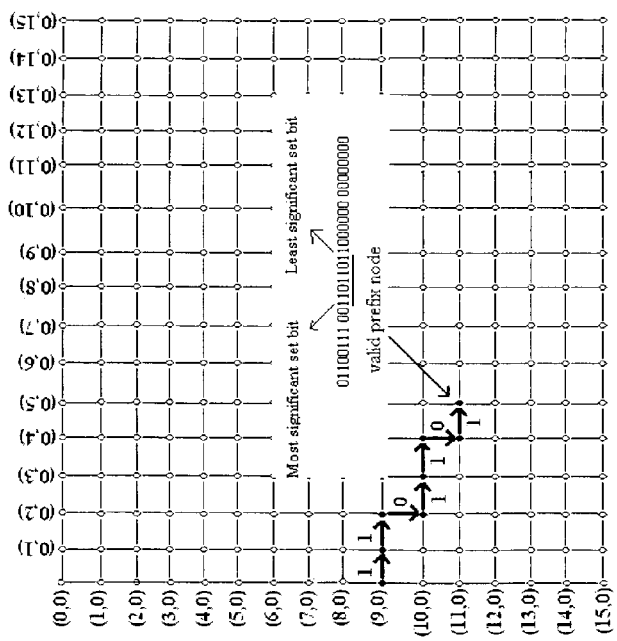
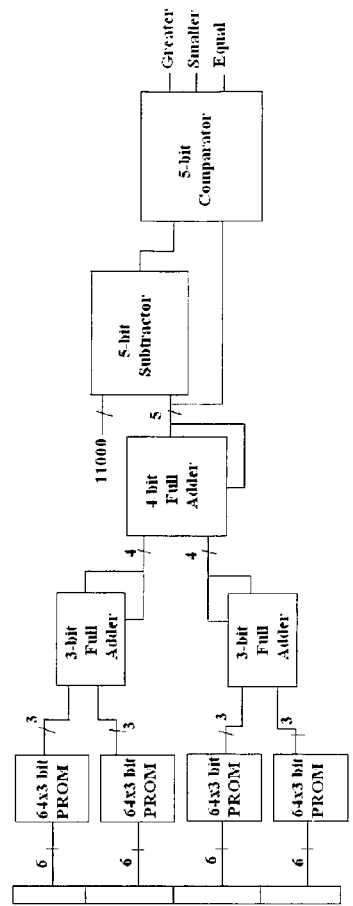
Figure 10
Figure 11

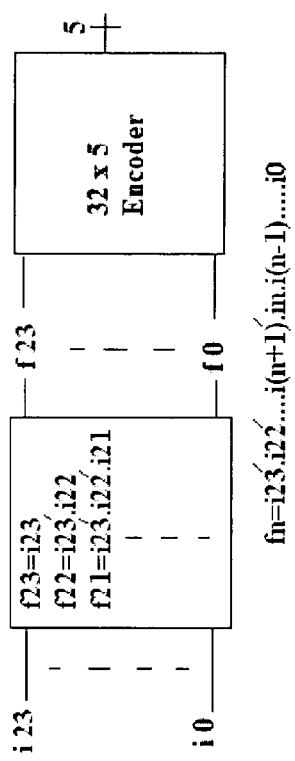
Figure 12
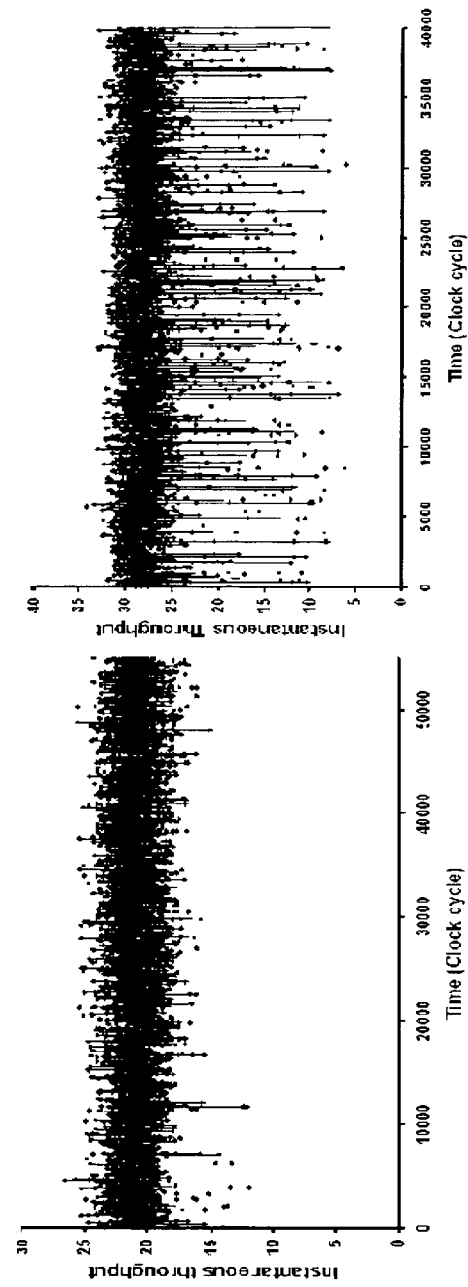
Figure 16A
Figure 16B

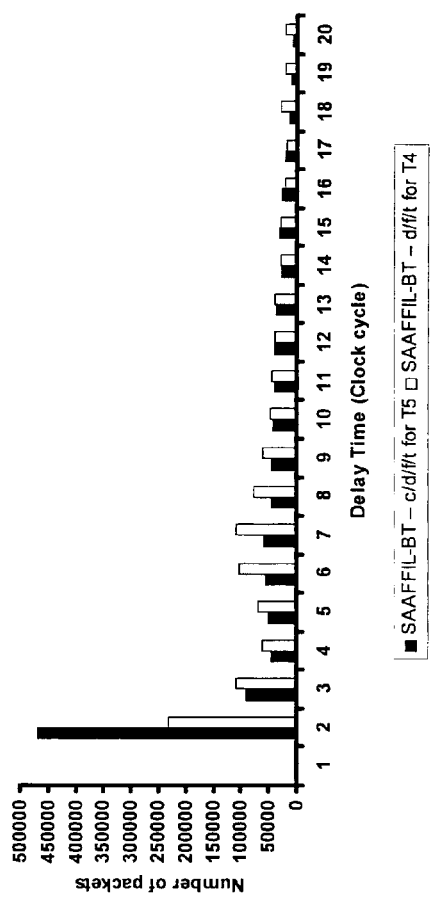
Figure 17
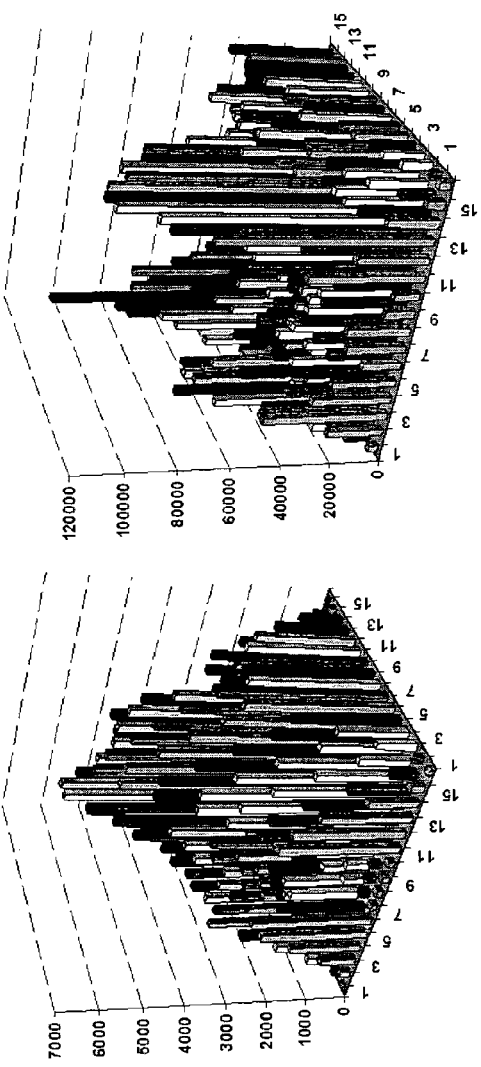
Figure 18A
Figure 18B

SYSTOLIC ARRAY ARCHITECTURE FOR FAST IP LOOKUP

FIELD OF THE INVENTION

This invention first presents SRAM based pipeline IP lookup architectures including an SRAM based systolic array architecture that utilizes multi-pipeline parallelism idea and elaborates on it as the base architecture highlighting its advantages. In this base architecture a multitude of intersecting and different length pipelines are constructed on a two dimensional array of processing elements in a circular fashion. The architecture supports the use of any type of prefix tree instead of conventional binary prefix tree. The invention secondly proposes a novel use of an alternative and more advantageous prefix tree based on binomial spanning tree to achieve a substantial performance increase. The new approach, enhanced with other extensions including four-side input and three-pointer implementations, considerably increases the parallelism and search capability of the base architecture and provides a much higher throughput than all existing IP lookup approaches making, for example, a 7 Tbps router IP lookup front end speed possible. Although theoretical worst-case lookup delay in this systolic array structure is high, the average delay is quite low, large delays being observed only rarely. The structure in its new form is scalable in terms of processing elements and is also well suited for the IPv6 addressing scheme.

PRIOR ART

Trie-Based IP Lookup:

IP lookup solutions can be categorized into two main groups as software and hardware based approaches. For software based solutions of LPM, the most commonly encountered data structure is the binary tree, in which the prefixes in the routing table are represented by marked tree nodes and the path from root to a node represents a prefix. FIG. 1 illustrates a prefix table and its corresponding prefix tree (referred as binary trie in the literature).

IP lookup is performed by traversing the binary trie using the bits in the searched IP address. When a leaf node or a null pointer is reached, search operation terminates and the last matched prefix is selected as the longest matched prefix. If all the prefix nodes are pushed to leaves, then the binary trie is called as leaf-pushed binary trie. In a leaf-pushed trie, a non-leaf node contains only pointers to its children and a leaf node contains only port number corresponding to its associated prefix.

SRAM Based Pipeline Architectures for Fast IP Lookup:

Single SRAM based IP lookup solutions need multiple memory accesses during the trie traversal in order to complete a single search process. During the search for an IP address, a new incoming search request waits for the ongoing lookup to finish up. In order to speed this up, various SRAM based pipeline architectures have been proposed [14], [15], [16], [17], [19], [20], [21], [22], [23], [24], [25]. In these architectures, the trie is partitioned and mapped onto pipelines. These pipelines are composed of separate memory banks that are connected in sequence. The trie traversal is then performed on these separate and multiple memory elements through the pipeline.

There are enough memory elements and no stage is accessed more than once during a search in a conventional one dimensional pipeline architecture. Although throughput is improved using a pipeline, an ordinary mapping of the binary trie onto the pipeline stages yields unbalanced memory utilization. Various different solutions have been proposed to address the memory balancing problem [14], [15], [16], [19], [21]. Baboescu et al. [14] proposes a ring pipeline architecture, which allows a search to be activated at any pipeline stage. This approach is based on dividing the binary trie into subtrees and allocating each subtree starting point to a different pipeline stage to create a balanced pipeline. The starting stage for each search is then determined by a hash function. The subtrees are stored in pipeline stages by using a level-based mapping where the trie nodes in same level are stored in the same pipeline stage. The depth of each subtree is selected to be less than or equal to the number of pipeline stages but the pipelines may roll back from the last stage to the first hence being called as ring structure. This pipeline architecture has two virtual data paths. The first path is active during the odd clock cycles and it is used for finding the starting stage. In other words, when a search is started, the pipeline is traversed until the relevant subtree root is found. The second data path is active during the even clock cycles and it correspond to the actual search continuing until the last stage of the pipeline. When the search is completed, the result propagates to the final stage for output through the remaining stages. Hence each pipeline stage works with a speed twice the maximum input packet rate. The throughput of the described Baboescu et al. architecture then becomes 0.5 lookups per clock cycle.

In [15], the previous approach is extended with an architecture called Circular, Adaptive and Monotonic Pipeline (CAMP). CAMP has a circular pipeline of memory blocks. The first block performs a direct lookup on the first r-bits of the address to find the stage where the root node of the corresponding subtree is stored. CAMP has multiple packet entry and exit points in order to improve the throughput. Initially the trie is split into one root sub-trie and multiple leaf subtries. Root subtrie handles first r-bits of the IP address implemented as a table and a maximum of $2^r$ subtries are independently mapped to the pipeline. Each pipeline stage has two entry and one exit points. Access conflicts are then solved by using a FIFO queue in each stage for the incoming requests. A request waits for an idle cycle to enter a pipeline stage. CAMP architecture can achieve a throughput of 0.8 lookups per clock cycle.

With an alternative mapping based on the height rather than the levels of the search tree, a worst case per stage memory bound has been obtained [19]. Since the height of the nodes changes when the prefix distribution changes upon route updates, this mapping becomes dynamic.

Jiang et al. [16] proposed the first parallel multi-pipeline architecture (Parallel Optimized Linear Pipeline (POLP)) in which each pipeline can operate concurrently to speed up the lookup (FIG. 2).

The trie is initially partitioned into subtrees which are then mapped onto the pipelines. In order to perform a balanced mapping, they proposed an approximation algorithm. Also within each pipeline, node to stage mapping is done and nops (no operations) [21] are used in some stages to balance the trie node distribution. This approach is efficient in terms of memory consumption but the search process is complicated.

n parallel destination index tables (DITs) are used to process n packets simultaneously and handle the mapping between subtrees and pipelines. In DIT, a pipeline ID is obtained using first few bits of the IP address. This pipeline is the one that stores the corresponding subtree and the address of the subtree's root in the first stage of the pipeline. POLP architecture also uses prefix caching for short term traffic bias, whereas the long term traffic among pipelines is balanced by an exchange based algorithm. This algorithm remaps the subtrees to the pipelines dynamically, bringing an extra disruption to the search process. POLP is improved further in later studies. For example a bidirectional linear pipeline is introduced in [17] and the idea of flow caching from Layer 4 switching is introduced in [22]. Flow caching eliminates long waiting times for cache updates. To improve POLP power efficiency, a hybrid SRAM/TCAM selector unit is also proposed in [24], [25], the aim being shortening pipeline lengths by introducing hybrid partitioning schemes.

The following patents are related to the present invention:

U.S. Pat. No. 7,418,536 B2 "Processor having systolic array pipeline for processing data packets"

The "IP lookup unit" of the network processor presented in the above invention is also designed by using systolic array architecture. But each stage of the systolic array architecture is composed of a small register file and functional units and exhibits a single pipelining behavior in one dimension only. On the other hand, in the present invention, processing elements (PEs) in the systolic array architecture has a single SRAM unit, a FIFO queue and a logic unit. The new architecture presented in this invention is a systolic array architecture that employs parallel pipelines in two dimensions. A multitude of intersecting and different length pipelines are constructed on the two dimensional array of PEs in a circular fashion and hence more benefit is obtained from parallelism.

U.S. Pat. No. 7,069,372 B1 "Processor having systolic array pipeline for processing data packets"

In the existing patent, a single on-chip memory unit is used for storing the whole routing table. In the structure developed within the present invention, each PE in the systolic array architecture maintains a smaller memory unit and therefore by employing more than one memory unit, it is possible to make parallel and independent memory accesses to each unit that increases the parallelism further.

U.S. Pat. No. 7,382,787 B1 "Packet routing and switching design"

In the existing patent, all units are programmable. In the new structure within the present invention, each PE in the systolic array triggers the next one and hence there is no need for programmability.

U.S. Pat. No. 7,525,904 B1 "Redundant packet routing and switching device and method"

The structure proposed in the existing patent operates at line speeds of 40 Gbps. On the other hand, the performance level achieved with the new structure developed within this invention is about 7 Tbps.

BRIEF DESCRIPTION OF THE INVENTION

The growth of the number of hosts on Internet and the increase in line speeds have resulted in powerful forwarding engines that can operate at line data rates and can cope with increasing numbers of routing table entries. In early days of Internet the simple class-based addressing scheme was sufficient but with the introduction of the classless inter domain routing (CIDR) scheme IP route lookup has become a major task for an Internet router. CIDR has two major benefits. First, prefixes can be of arbitrary length in CIDR and hence the address space can be used more efficiently. Second, CIDR allows arbitrary aggregation of networks and therefore the number of routing table entries decreases, which slows down the growth of forwarding tables. In CIDR, addresses may match two or more entries in a routing table because of prefix overlap. In such cases for a correct decision, the router must find the most specific match, which is referred as the longest prefix matching (LPM). LPM is harder than finding the exact match because the destination address of an arriving packet does not carry any information about the length of the longest matching prefix. For LPM, there are both software and hardware based solutions proposed in the literature [1], [2]. For measuring the success of these IP route lookup solutions various metrics such as number of memory accesses, memory size, update time, scalability and flexibility are used.

A key can be searched in an entire list of pre-stored memory entries in one clock cycle using a content addressable memory (CAM). The conventional CAMs store binary values and hence can be searched only for an exact match. Ternary content addressable memory (TCAM), in which each cell can take values 0, 1 or don't care, is more powerful because don't cares may act as wildcards during a search and hence LPM can be solved naturally in one cycle [3]. Although TCAM5 are quite popular, they have high cost and high power consumption as major drawbacks [4], [5], [6], [7], [8], [9], [10], [11], [12], [13]. Other handicaps are their slow updating rate and low scalability. Internet requires a forwarding table to be updated frequently to reflect the route changes and a single update, which includes either adding or deleting a prefix, may involve multiple TCAM entry moves in order to maintain the order of the TCAM entries. Low scalability arises from the need for a priority encoder at the TCAM output stage. On the other hand, a static random access memory (SRAM) has better density, power consumption and speed characteristics compared to TCAM. But if LPM is solved using an SRAM, the number of memory accesses is determined by the average depth of the binary tree that stores prefixes in the routing table. The tree traversal process on a single SRAM needs multiple memory accesses and hence multiple clock cycles for finding the longest matched prefix. Therefore, SRAM based pipeline architectures, which improve the throughput, have also become popular [14], [15]. The first parallel multi-pipeline SRAM based architecture for IP lookup, in which each pipeline can operate concurrently, has appeared in [16] and enhanced in [17].

A systolic array is a natural structure for multiple and intersecting pipelines. In this invention the multi-pipeline parallelism idea is used and a novel SRAM based systolic array architecture for fast IP lookup (referred as SAAFFIL) is developed. For this purpose, i) a special systolic array processing element (PE) composed of a basic SRAM, FIFO queue and associated peripheral logic circuitry is designed, ii) invented PEs are organized in a two dimensional circular structure to get different length and intersecting pipelines, iii) a suitable and efficient tree mapping scheme is devised iv) the corresponding IP lookup process is presented. In SAAFFIL, instead of using n parallel pipelines, each of which has m stages with a total of nm resources, a circular structure in the form of $\sqrt{nm} \times \sqrt{nm}$ square grid of resources is used. Using SAAFFIL, a 2 Tbps router IP lookup front end speed became possible.

In the present invention, the base architecture SAAFFIL is substantially extended further to achieve a much better performance. Overall, in the invention, the following major contributions are made:

1. SRAM based pipeline architectures for fast IP lookup is reviewed and SAAFFIL as the base architecture is elaborated highlighting its advantages.
2. The base architecture SAAFFIL is enhanced by including a novel use of an alternative and more advantageous prefix tree based on binomial spanning tree to achieve a substantial performance increase (referred as SAAFFIL-BT). For this purpose in the invention;
   a) a binomial spanning tree based forwarding table construction method is devised, b) a binomial spanning tree mapping strategy onto the architecture is designed, including the development of a novel concept, named as dual root partitioning, c) the corresponding IP lookup process is presented for the new structure SAAFFIL-BT, d) the selector unit design for SAAFFIL-BT is given.

3. SAAFFIL-BT is extended for further performance gain. For this purpose, the following are considered;

a) cache use at the inputs, b) dual input/output SRAM use in PEs, c) four-side input possibility, and d) three-pointer representation and implementation of the binomial spanning tree.

4. The effectiveness of the invention is demonstrated through simulations using both synthetic and real life IP traces. For this purpose, the following are considered;

a) throughput, b) delay statistics, c) tree node distribution over memory units, and d) search load distribution.

The prefix tree of any kind can be mapped onto the invented two dimensional array of PEs. Use of binomial spanning tree instead of binary search tree, which necessitates modifications in the architecture, brings the following advantages in addition to SAAFFIL advantages:

shorter search paths and hence shorter pipelines (throughput advantage)

fewer tree nodes stored in SRAMs (reduction in memory size and hence access times)

To benefit from the binomial spanning tree, efficient implementations of it should be employed. In this invention, a multi-pointer binomial spanning tree implementation is used as an extension. Other extensions to the proposed architecture, as listed above, are also possible with minor modifications. For example, the architecture is suitable for cache use in order to handle the temporal bias of search requests towards a specific pipeline. It is also suitable for dual input/output SRAM use in PEs and for four-side input possibility.

In this invention, overall, a search engine, i.e., SAAFFIL-BT, is obtained with increased parallelism and search capability providing a higher performance than the existing architectures including the base invention SAAFFIL. Simulations indicate that SAAFFIL-BT, which can be employed as a high speed router front end for IP lookup, can operate at 7 Tbps speed with the use of binomial spanning tree and the proposed extensions. To the best knowledge of the inventors, this is much better than all existing IP lookup approaches. Although theoretical worst-case lookup delay in the systolic array structure is high, the average delay is quite low, large delays being observed only very rarely. The structure in its new form is scalable in terms of processing elements and is also well suited for the IPv6 addressing scheme.

The rest of this document is organized as follows: Section 2 presents brief background information on prefix tree search and a review of existing SRAM based pipeline architectures. Section 3 presents the invented multi-pipeline systolic array architecture for fast IP lookup (SAAFFIL) and elaborates on this structure highlighting its advantages. Section 4 explains the adaptation of the SAAFFIL to use binomial spanning tree and presents SAAFFIL-BT. Section 5 presents further extensions to improve overall performance. Section 6 discusses the simulation results and evaluates the performance of the invention.

DETAILED DESCRIPTION OF THE INVENTION

Brief Description of the Figures

In order to explain the present invention in more detail, necessary figures have been prepared and attached to the description. The list and definition of the figures are given below.

FIG. 10—illustrates an IP search example for 103.54.192.0

FIG. 11—illustrates circuit for comparing the number of 'ones' and to 'zeros' in a 24-bit string FIG. 12—illustrates circuit for finding the most significant set bit position in a 24-bit string.

FIG. 16A—illustrates instantaneous throughput fluctuation in SAAFFIL-BT—d/f/t for T4.

FIG. 16B—illustrates instantaneous throughput fluctuation in SAAFFIL-BT—c/d/f/t for T5.

FIG. 17—illustrates the delay histogram for the simulation of SAAFFIL-BT—d/f/t for T4 and SAAFFIL-BT—c/d/f/t for T5.

FIG. 18A—illustrates the trie node distribution over SRAMs for SAAFFIL-BT—c/d/f/t for T5.

FIG. 18B—illustrates the search load distribution over SRAMs for SAAFFIL-BT—c/d/f/t for T5.

BRIEF DESCRIPTION OF THE TABLES

In order to explain the present invention in more detail, necessary tables have been prepared and attached to the description. The list and definition of the tables are given below.

Table 1—illustrates an example of prefix tables.

Figure 15:
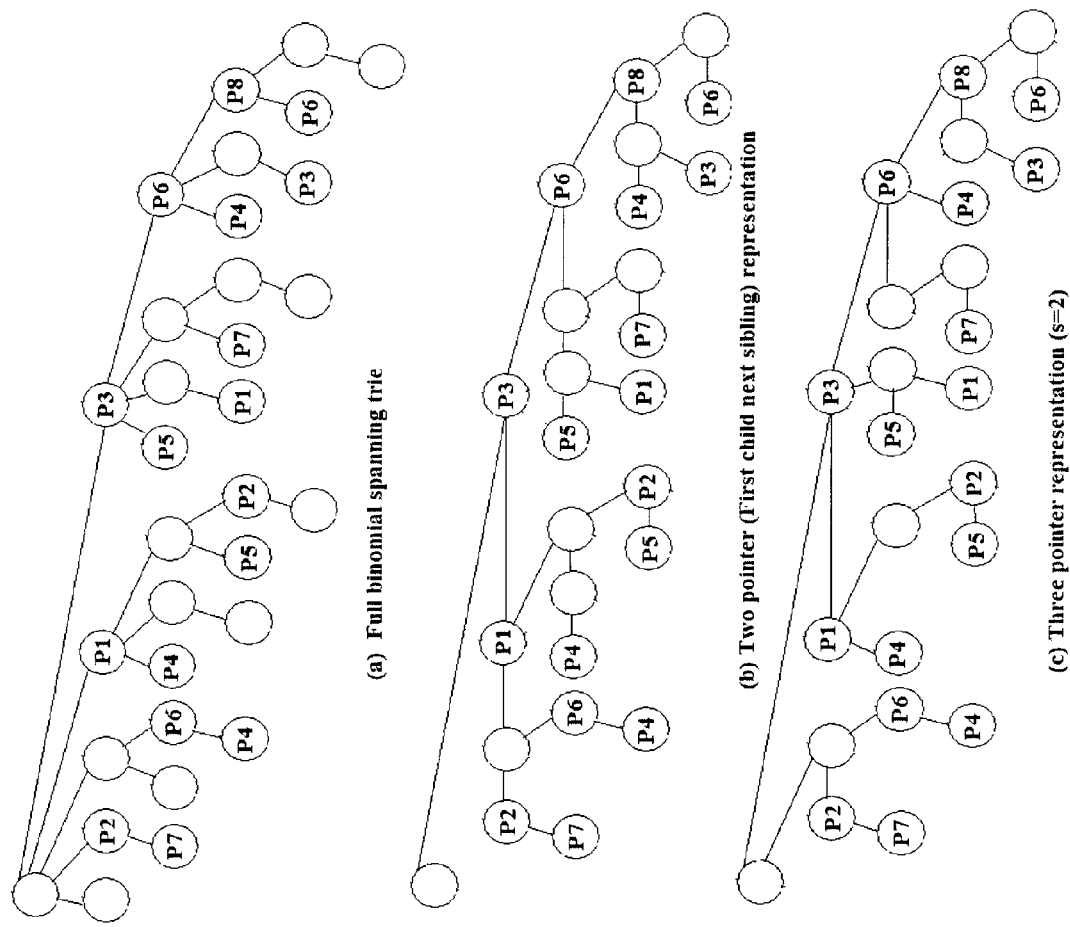
FIG. 15—illustrates examples of binomial tree representations.

Table 2—illustrates search path length of prefixes for FIG. 15.

Table 3—illustrates throughput of SAAFFIL-BT

Table 4—illustrates SRAM access time estimates in nano second.

Table 5—illustrates average lookup delay of SAAFFIL-BT in clock cycles.

Table 6—illustrates comparison with existing parallel architectures

Figures 1A, 1B:
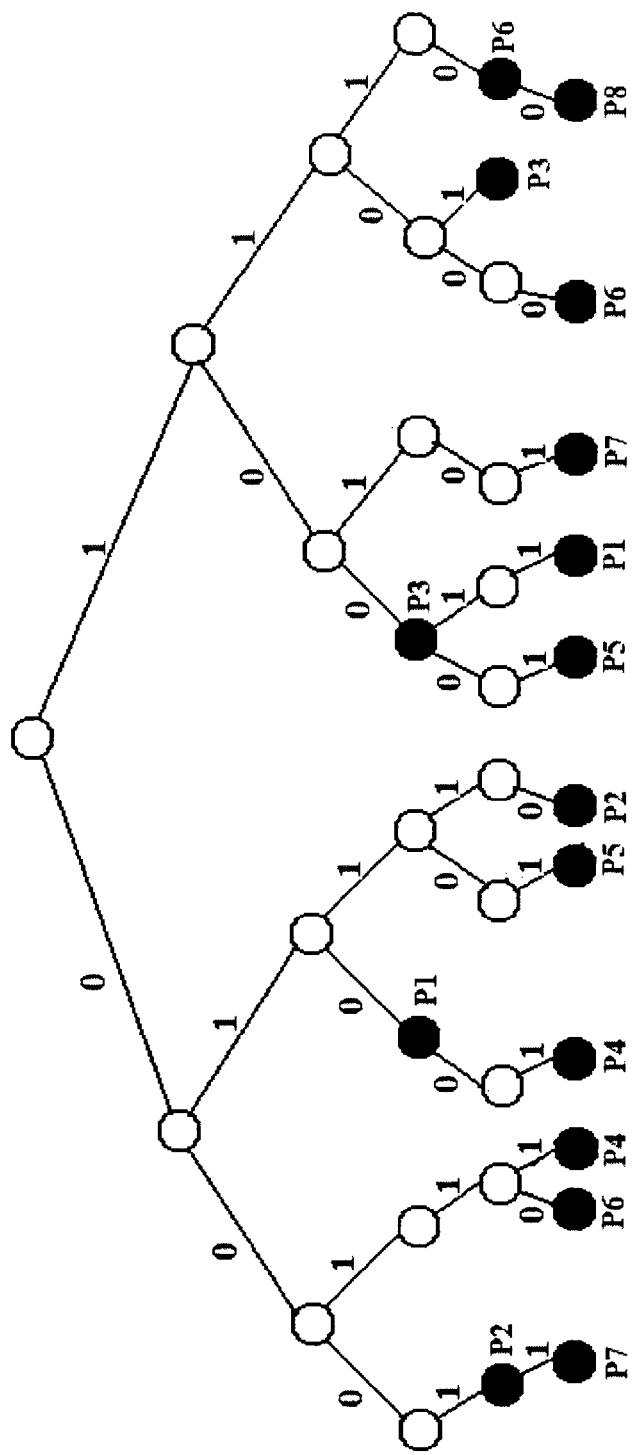
FIG. 1A—illustrates an example of a prefix table.
FIG. 1B—illustrates an example of binary trie corresponding to prefix table in FIG. 1A.
Figure 2:
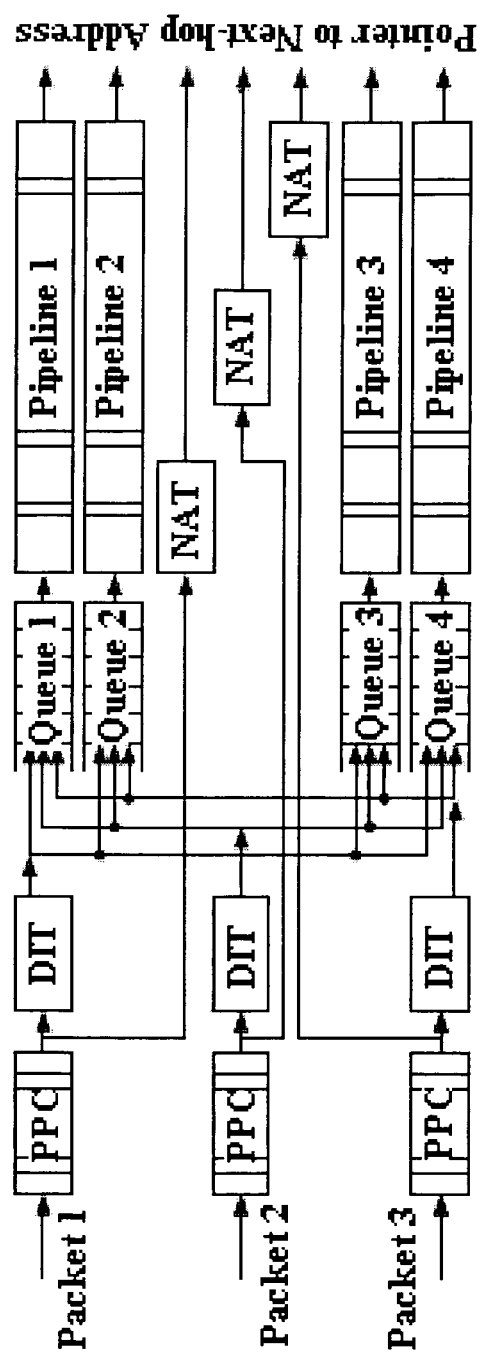
FIG. 2—illustrates an example SRAM based parallel pipeline architecture.
Figure 3:
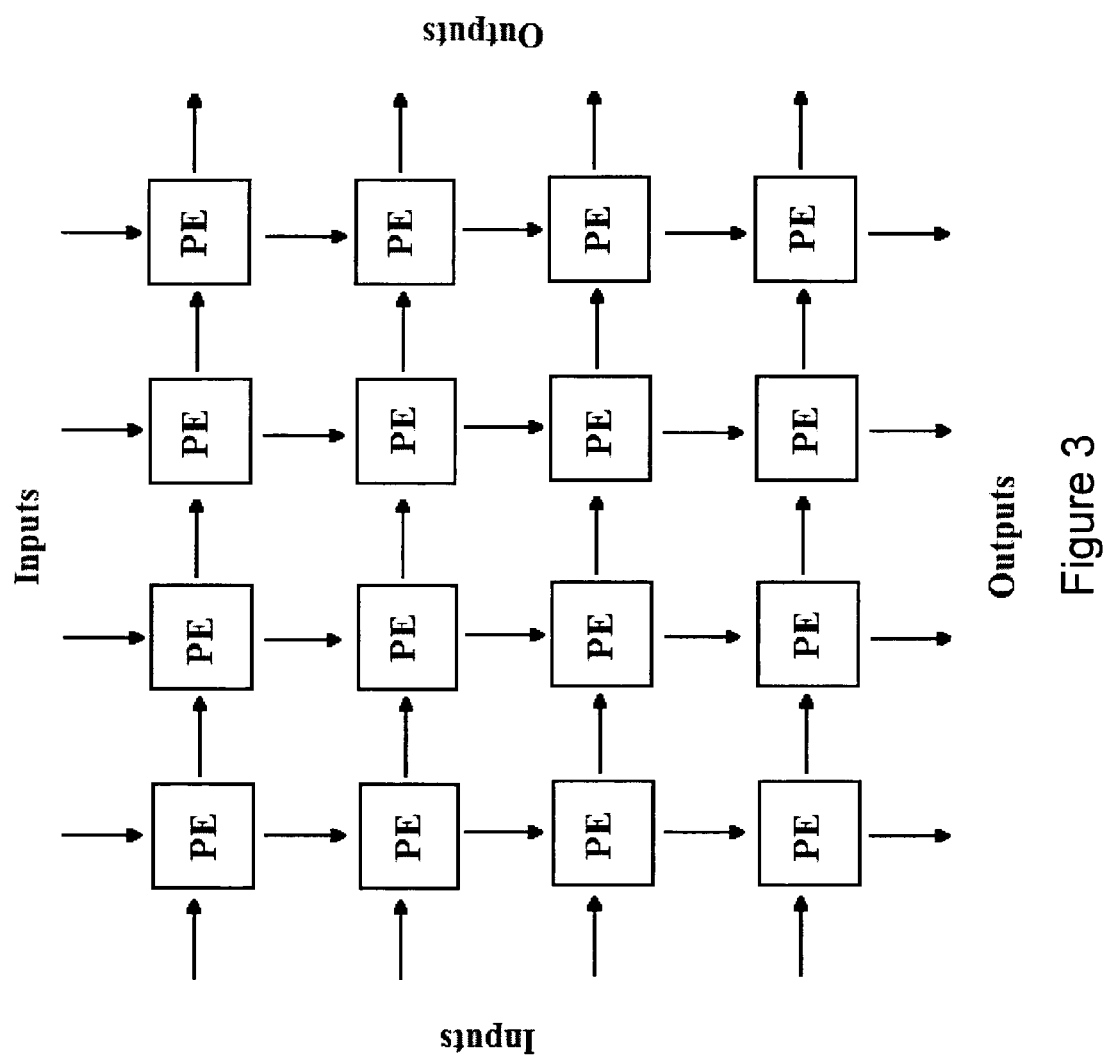
FIG. 3—illustrates an example 4×4 systolic array.

Systolic Array Architecture for Fast IP Lookup (SAAF-FIL):

A systolic array is a matrix-like pipe network arrangement of data processing elements (PEs). It is a specialized form of parallel computing, where PEs compute data and share it with their neighbors immediately after processing. A PE is similar to a central processing unit except for a program counter since operation is synchronous but transport-triggered, i.e., by the arrival of a data object. The systolic array is often rectangular where data flows across the array between neighboring PEs, often with different data flowing in different directions. The communication with the outside world occurs only at the array boundary. FIG. 3 presents an example 4×4 systolic array.

Although systolic arrays are usually known to be expensive, highly specialized and difficult to build, they have attractive properties such as synchronization, modularity, regularity, locality, finite connection, parallel pipelining and modular extendibility.

Figure 4:
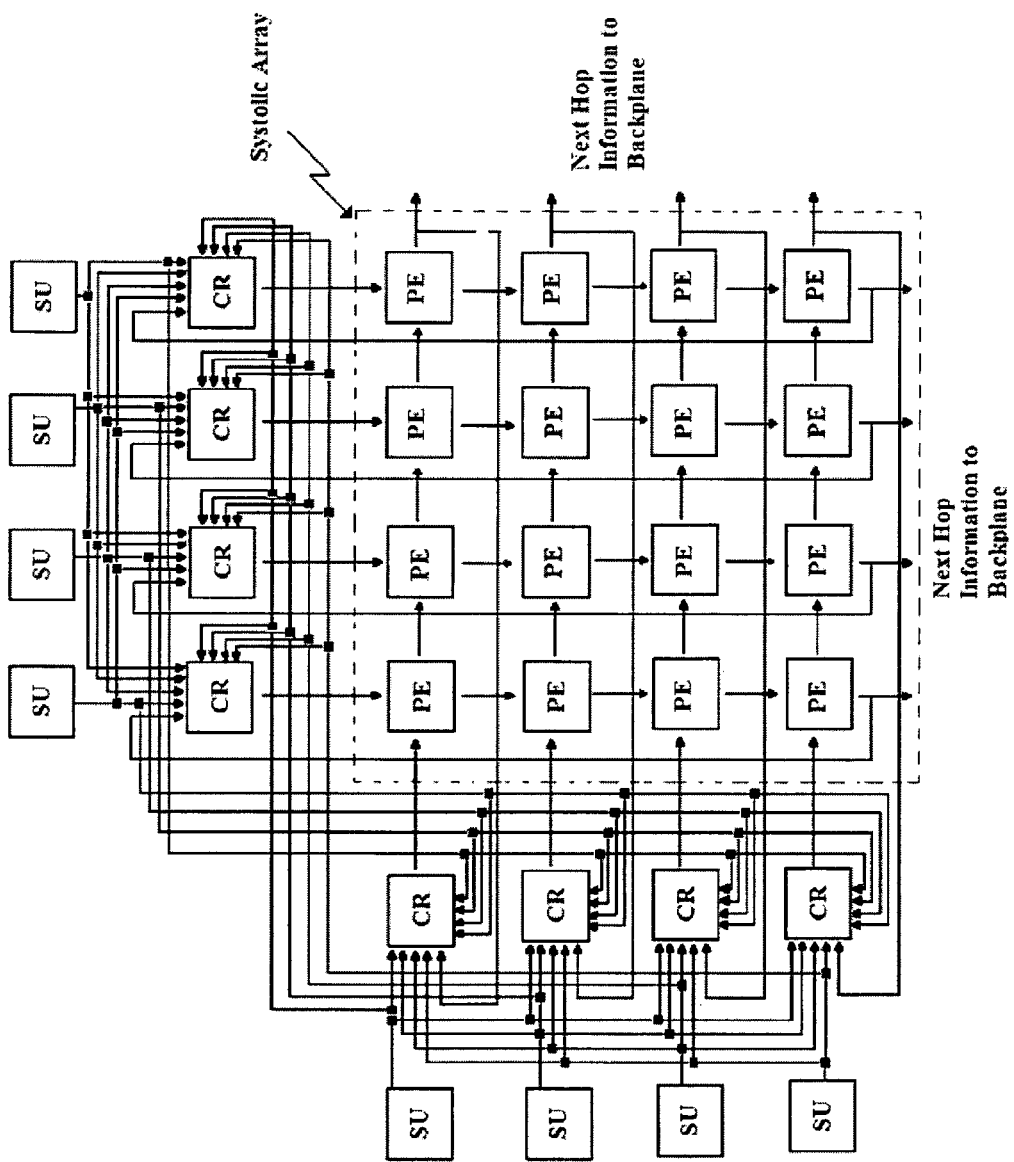
FIG. 4—illustrates 4×4 SAAFFIL.

It is observed that a systolic array, which implements parallel pipelines naturally, is a good candidate for SRAM based parallel IP lookup. To speedup the search and hence increase the router throughput, using a systolic array like organization, as shown in FIG. 4, is proposed in this invention.

In this approach, a multi-directional (towards east or south) data flow, in contrast to existing one dimensional SRAM based multi pipeline proposals, may exist through the systolic array during a search process and in this way the pipeline utilization under real IP traffic conditions is increased. In the present invention, the general systolic array structure is extended such that invention includes connections between the endpoints of each row and column as illustrated in FIG. 4. Hence a pipeline corresponding to a branch in prefix tree can be mapped onto the array of PEs by wrapping it around the corresponding row or column. A selector unit (SU) specifies the starting stage of a new search request. Since more than one search request may arrive at an input stage PE, there is a need for contention resolvers (CR) in order to be able to get an IP address into the system to be searched. Each SU is connected to every other CR. Number of SUs is a design choice and defines the maximum number of search requests that can be admitted to the system. The endpoints of each row and column are also connected to the CRs. If a circulating search exists, other search requests from SUs are not accepted by CR.

Backplane may get port number (next hop router) information only from the output boundary PEs if backplane simplicity is desired (as is the case in FIG. 4), or this information can be presented by each PE to the backplane if wiring complexity is not an issue.

Figure 5:
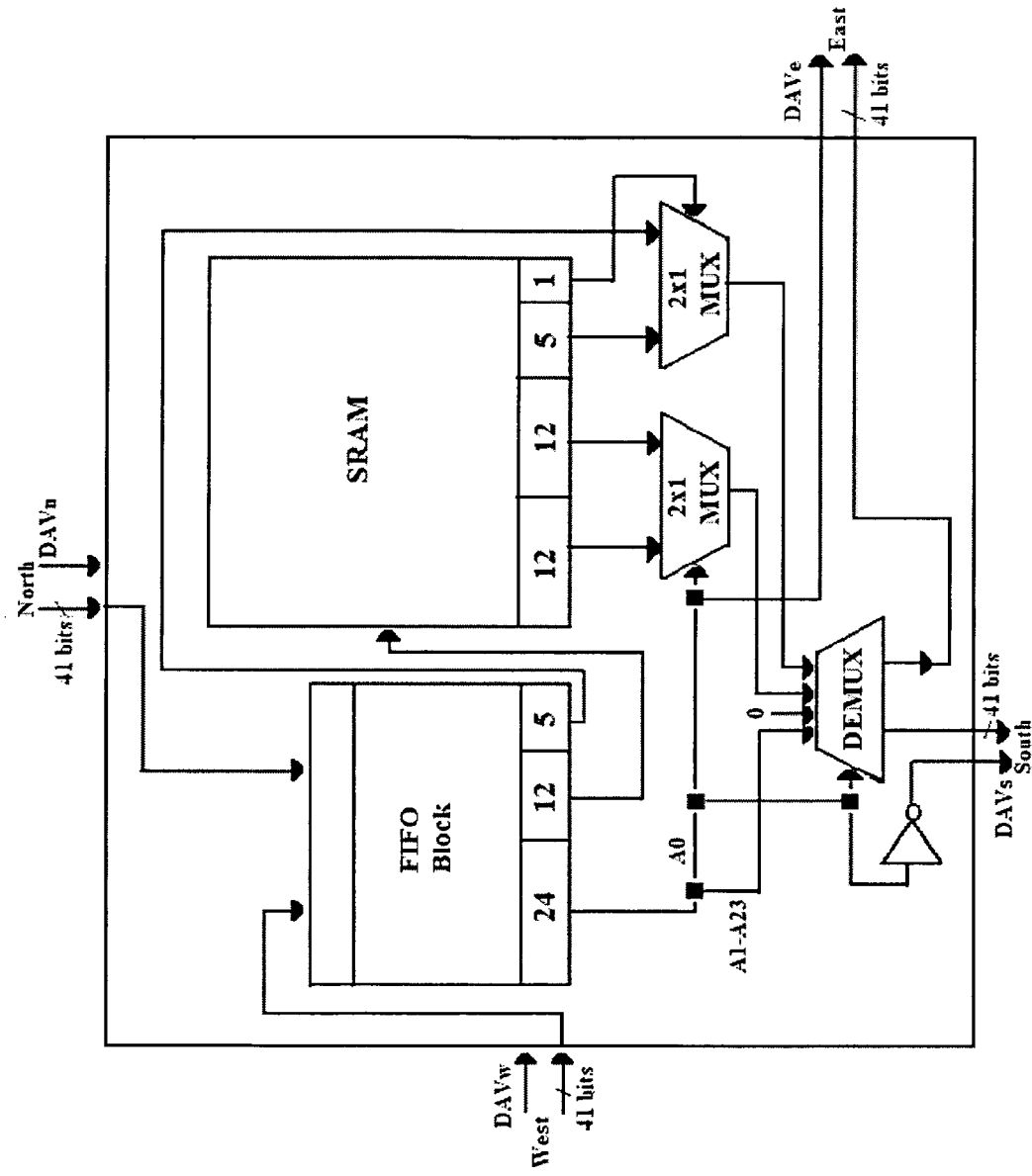
FIG. 5—illustrates processing Element (PE).

Processing Elements:

A PE in the invented systolic array consists of a FIFO queue block and an SRAM memory unit with some additional computational logic as illustrated in FIG. 5.

Each element has two input buses (north and west) that are directly connected to the FIFO queue. Two output buses (east and south) connect to neighboring PEs. FIFO queue is employed because during one SRAM access cycle two search requests may arrive simultaneously to a PE from north and west inputs. FIFO queue can be implemented using an SRAM and some associated registers. It is assumed that in one SRAM read cycle two requests can be inserted into this queue. This is reasonable because the size of FIFO queue is selected to be much smaller compared to the size of the main SRAM unit. In addition to FIFO queue and SRAM block, each PE contains additional combinational circuitry to route the IP prefix search to next stage (FIG. 5). With every system clock two new frames (composed of searched IP address bits plus additional architectural data) arriving from north and/or west (if data is available) may be inserted into the queue and a frame taken out of the FIFO queue (if not empty) may be presented to the SRAM block, which then transforms and routes it to the input of either east or south FIFO queue of the next stage. The connection (frame that is transferred in parallel) between any two PEs consists of a (24+n+m)-bit wide data bus, for an SRAM of $2^n \times (2n+m+1)$ bits, the last bit being a data available (DAV) signal. Most significant 24 data bits are the least significant 24-bits of the key (IP address) being searched, next n-bits are used for the address to be accessed in the next stage SRAM unit, and the last m-bits are used to transfer port number information. FIG. 5 assumes n=12 and m=5. A search packet carries the latest longest match port number through each traversed PE not to backtrack from the last stage when a search terminates. Port number field may be updated in some of the SRAM blocks. In this way, if there is no match in the last stage, port number updated with a previous match that corresponds to the longest match is obtained without any backtracking at the final stage of the search.

The IP address bit that corresponds to the current stage determines the next hop to be south or east. Each SRAM unit stores (2n+m+1)-bits in each entry, having two n-bits of south and east neighbor SRAM indices, an m-bit port number field and a valid bit (indicating whether the current tree node is a prefix node or an intermediate node).

If a leaf-pushed trie is used, since a non-leaf node contains only pointers to its children and a leaf node contains only port number, use of a (2n+1)-bit wide SRAM will be sufficient. The forwarding table is then constructed using a suitable prefix search tree mapping strategy as described in subsection 3.3.

Congestion Control Mechanism:

Since resource usage conflicts on intersecting pipelines are handled using a queue in each PE, packet loss due to queue overflow is possible. A simple congestion control mechanism may be employed. One possibility is additive increase multiplicative decrease strategy. If the FIFO queue occupancy exceeds the predefined threshold value then half of the SUs are deactivated to decrease the load at the input of the whole system. On the other hand if the queue occupancy is under the threshold then the number of active SUs may be increased by one at each clock cycle until all SUs become active again.

Tree Mapping:

Prefix tree mapping to PEs is a critical issue. An unbalanced tree node distribution over stages may decrease overall performance because the clock rate of the system closely depends on memory access times of stages and the access time of memory is proportional to its size. The larger the memory the slower it is.

Tree mapping is done in two steps:

1. Initial Partitioning: In pipelined architectures, prefix search tree is partitioned onto separate memory blocks and the trie traversal is performed on these memory elements in multiple cycles. Memory units in PEs or stages in SAAFFIL are also used to store such tree nodes. In order to utilize parallel pipelines, one has to divide the binary search tree into separate subtrees (called initial partitioning). Whichever prefix search tree type (binary or binomial for example) is used, employing circular pipelines and an initial partitioning strategy may help in providing a balanced distribution of tree nodes on pipeline stages.

Figure 6A:
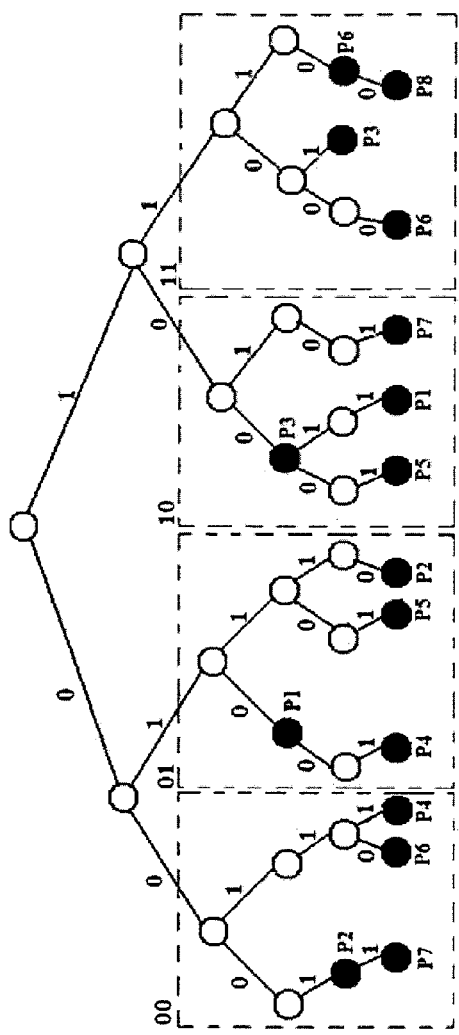
FIG. 6A—illustrates an example of initial partitioning.

Similar to previous works, partitioning strategy of the invention is to use several initial bits of prefix as an index to partition the trie into disjoint subtries. r initial bits used for this purpose is called as initial stride. An initial stride value defines a subtrie and hence $2^r$ possible subtries can then be mapped onto pipelines. FIG. 6a illustrates an initial partitioning on a binary trie for r=2.

Figure 6C:
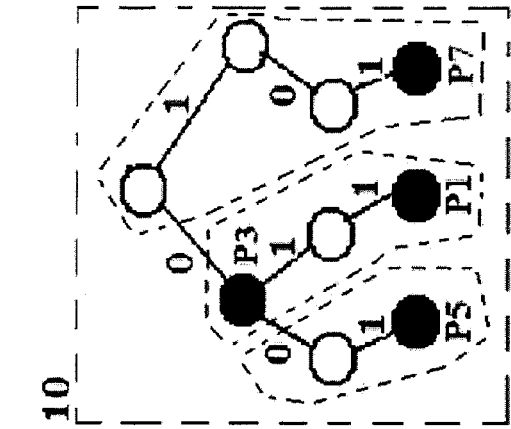
FIG. 6C—illustrates zero skip clusters.
Figure 6B:
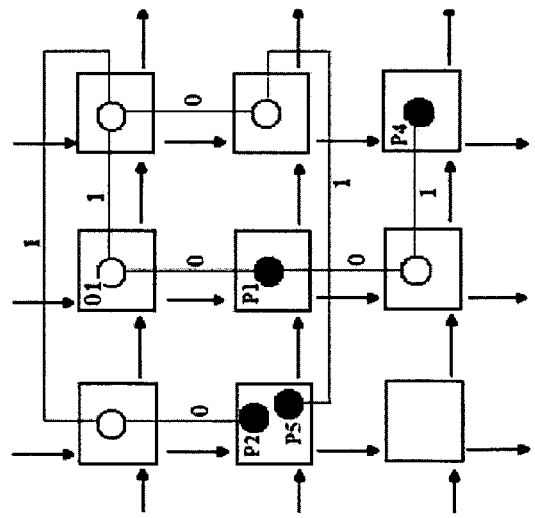
FIG. 6B—illustrates an example of mapping of 01 subtrie.

2. Subtrie Mapping: There can be more subtries than the number of input stages. One can use initial stride value within a suitable strategy to determine the starting stage PE to which the root of the corresponding subtrie is stored. Afterwards, node-to-stage mapping can be done simply by storing each subtrie node in consecutive PEs. FIG. 6b illustrates the mapping of one such subtrie (subtrie id 01 as an example) to corresponding PEs in a 3×3 SAAFFIL. In this example mapping, if the corresponding prefix bit is 0 then the next tree node is stored in the south neighbor PE, otherwise it is stored in the east. If circular connections between boundary PEs were not allowed such a mapping would not be possible.

Skipping the leading zeros (or ones) of a prefix is also possible if a third level of partitioning (zero-skip (or one-skip) clustering) is introduced. Its details are explained later but FIG. 6.c illustrates zero case for 10 subtrie only.

The mapping of the subtries to PEs in two dimensions brings a certain level of randomness and therefore no extra effort is needed for balancing the tree node distribution over SRAM units unlike existing approaches.

Lookup Process:

An IP lookup process (search request) starts at a selector unit (SU). Then this SU, using initial stride of the searched key, finds the input stage PE and the memory address of the corresponding subtrie root in this PE.

If more than one simultaneous search requests arrive at the same input stage PE, then one of the requests is selected by CR and the others are put on hold using any suitable strategy. If there is a circulating search, other search requests are not accepted by the corresponding CRs and the circulating search continues its operation being admitted to the PE. An SU in hold state keeps its current request on hold being not able to accept a new request and contends in the next cycle similarly. CRs admit their winning search requests to their input stage PEs. Then the search flows through other SAAFFIL stages using other bits than the initial stride. If the corresponding bit of the IP address is 0 then the next hop is towards south, otherwise it is towards east. Through each PE, the 5-bit port number field in the traversing frame is updated if the stored prefix node is valid, i.e., colored in the search tree. For leaf pushed tries, port numbers are obtained from leaf nodes only, in other words LPM can be found only at the last stage of each pipeline for such tries.

Advantages of SAAFFIL:

Major advantages of SAAFFIL in comparison to the existing SRAM based approaches can be listed as follows:

The number of request entry points to the search engine is increased and hence input contention is reduced. Resource (PE) usage conflicts on intersecting pipelines are handled using a FIFO queue in each PE.

Provisioning of exit points from any stage other than the boundary and keeping the operating pipes shorter increases, unlike the existing architectures, resource availability for other parallel search operations.

Mapping the prefix subtrees to PEs in two dimensions brings a certain level of randomness and therefore, unlike the existing approaches, no extra effort is needed for balancing the tree node distribution over SRAM units.

The proposed architecture is scalable in terms of number of PEs and hence it is well suited for the IPv6 addressing scheme. If the prefix length gets larger, for example 128 as in IPv6, only the size of the memory units in PEs, the width of FIFO queues in PEs and the width of connections between PEs have to be increased. Number of PEs and their organization can be kept unchanged.

Systolic Array Architecture for Fast IP Lookup with Binomal Trie (SAAFFIL-BT):

Chang [26] has proposed a binomial spanning tree based IP lookup approach having simple search and update processes similar to binary trie but with better performance in terms of memory requirement and lookup time. Use of binomial prefix tree instead of binary trie may bring a considerable performance advantage in terms of throughput besides less memory use but necessitates some modifications in SAAFFIL hence resulting in SAAFFIL-BT. An efficient implementation of binomial prefix tree is also obviously beneficial.

Figure 7:
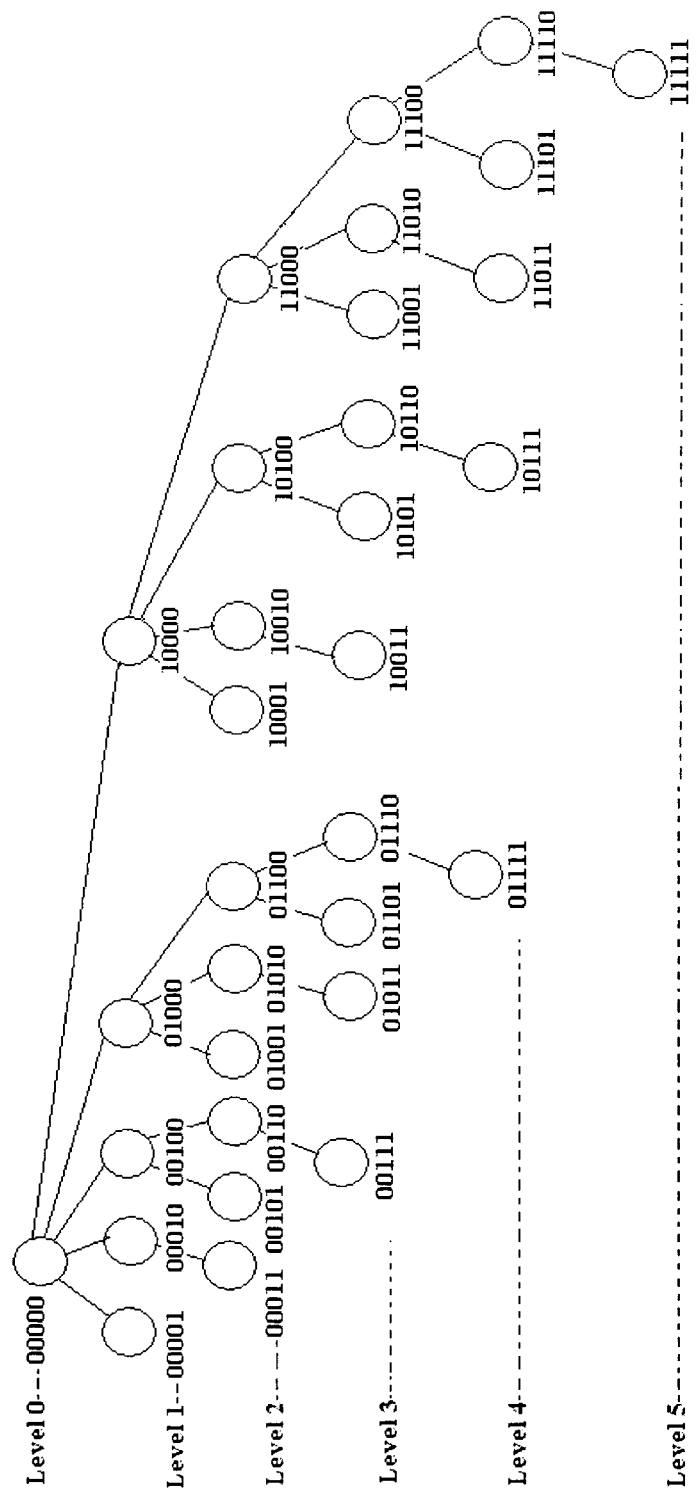
FIG. 7—illustrates a binomial spanning tree with 5-bit address space.

Binomial Trie:

FIG. 7 depicts the 5-bit binomial spanning tree where each node of the tree has a constant length binary address.

The nodes including the same number of '1' bits in their node addresses reside in the same level of the binomial spanning tree. In other words, the level of a node in a binomial spanning tree depends on the number of '1' bits in its node address. If some of the nodes are marked as prefix nodes and unused nodes are deleted as in a binary trie then this structure is called as a binomial prefix tree (binomial trie (BT) in short throughout this text). Similarly, in a BT, the number of nodes traversed throughout the search process depends on the number of '1's in the node address. Hence search operation in BT is different from that in binary trie. For instance, if the best matching prefix (BMP) is 01010/5 in a 5-bit address space, the distance between the root and the BMP node is only two hops, i.e., node addresses 00000, 01000 and 01010 are visited only (FIG. 7).

Binomial Trie Based Forwarding Table:

The conversion from binary trie to its BT representation is straightforward. Using the initial prefix table, a new one is generated and the BT is constructed using this new table. New prefix table referred as ST address table should include constant length prefixes which may be obtained by appending '0's (or '1's) to all the prefixes. For instance, for '0' appending case, prefixes 011* and 10* will be converted to 01100 and 10000 in 5-bit address space, respectively. However, appending '0's (or '1's) may result in conflicts, i.e., more than one prefix can be mapped onto one single node of the BT. Prefixes 01* and 010* are such examples that will be mapped onto the same node 01000 in 5-bit BT with the above approach. Two solutions for handling such conflicting prefixes can be used [26]. The first one is using an additional prefix array for storing conflicting prefixes. The second one is expanding the conflicting prefixes of shorter length to longer ones in such a way that no BT node stores more than one prefix. The first approach has the advantage of simpler updates whereas in prefix expansion there is no need for the additional prefix array. However, in this invention, use of Minimum Independent Prefix Set (MIPS) algorithm [27], [28] is preferred. Although it is a more complex version of the second approach, it also provides memory compaction for the forwarding table while generating independent prefixes. MIPS output is then used for the construction of the BT.

Binomial Tree Mapping:

Binomial tree mapping consists of three major steps:

1. Initial partitioning is done as described in section 3.3 on the original binary trie.
2. Dual root partitioning: It is observed in this invention that BT nodes can be divided into two groups. One group contains nodes that have greater number of '0' bits in their addresses and the other group contains the rest (with greater number of '1' bits in their addresses). For example in FIG. 7, the first group (upper BT) contains the nodes in level 0, 1, and 2 while the other one (lower BT) contains the nodes in level 3, 4, and 5.

Figure 8:
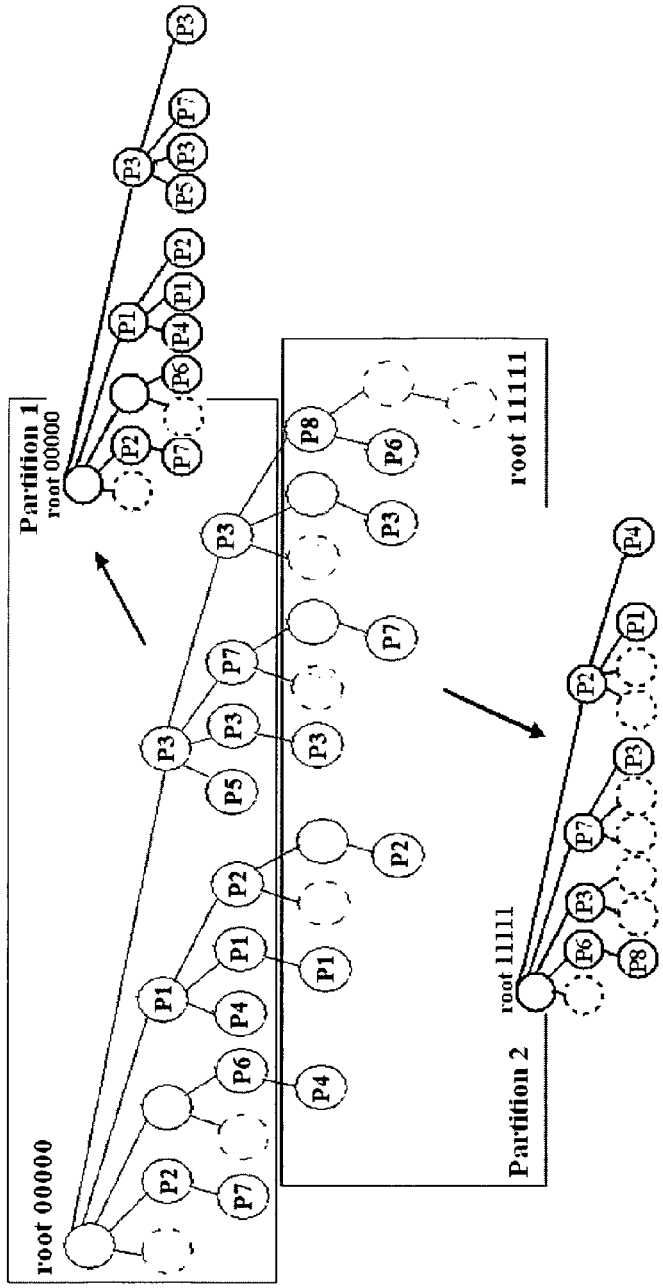
FIG. 8—illustrates an example of dual root partitioning of BT.

BT has a nice property that both partitions can be represented as separate but similar BTs with approximately half the original depth. In one BT, root node address is all '0's and in the other all '1's (as can be seen in FIG. 8). This approach, that is called dual root partitioning in this invention, brings a considerable depth advantage for prefix search. Dual root partitioning is applicable not only to a BT but to any subtrie of a BT therefore for each prefix table obtained as a result of initial partitioning of the binary trie, two separate BTs may be constructed.

In order to benefit more from dual root partitioning, the following modification of the prefix conversion step described in previous subsection 4.2 is proposed in this part. In this modification, the difference between the number of '1's and the number of '0's in prefixes is used as follows:

---
procedure PrefixConversion
---
Input: prefix p; $n_1$: number of '1's in p; $n_0$: number of '0's in p; r: initial stride
Output: q = {q1, q2} where q1 and q2 are 32 bit BT node addresses
1: if $|n_1 - n_0| < (32-r- length(p))$ then
2:     $q_1 = p + 0^{(32-r-\ length(p))}$   ; append '0's to p
3:     $q_2 = p + 1^{(32-r-\ length(p))}$   ; append '1's to p
4:     q = {$q_1, q_2$}
5: else
6:   if $(n_1 - n_0) > 0$ then
7:     $q_1 = p + 1^{(32-r-\ length(p))}$   ; append '1's to p
8:   else
9:     $q_1 = p + 0^{(32-r-\ length(p))}$   ; append '0's to p
10:    q = {$q_1$}
11. end In the above method some of the prefixes are appended with all '1's (line 7), some with all '0's (line 9) and some both ways (lines 2-3).

It is observed in this invention that the level of a node is determined by the number of '1's (in the upper BT) and the number of '0's (in the lower BT) in a prefix. New approach in the invention, by making prefix conversion wiser, guarantees the prefix to be placed in a better level in its corresponding BTs compared to the trivial approach. For example, prefix 10111* will be converted to binary address 1011111 in 7-bit address space using the present invention, which will then be stored in level 1 of the lower BT. In the trivial '0' appending case however, this conversion would have resulted in 1011100, which would then be stored in level 3 of the same partition. In this way, the number of memory accesses required for reaching the prefix 10111* will be reduced from three to one.

Table 1 and FIG. 8 present a simple dual root partitioning example. Table 1 columns give prefixes and their associated port numbers. The original prefix table, shown in the first column, is first applied to the MIPS algorithm. Next, the disjoint prefix set obtained (second column) is converted to BT address table (third column) using the above prefix conversion algorithm. This final table including 5-bit constant length addresses corresponding to prefixes is then used to construct two separate BTs (upper and lower BTs or partitions) as in FIG. 8. Dashed nodes indicate those binomial spanning tree nodes that are not stored in memory in representing BT but are included in the figure for illustration purposes only.

TABLE 1

An example of prefix tables

| Initial Prefix Table | | MIPS Table | | BT Address Table | |
|---|---|---|---|---|---|
| Prefix | Port Number | Prefix | Port Number | Prefix | Port Number |
| 010* | P1 | 01000 | P1 | 01000 | P1 |
| 100* | P3 | 0101* | P1 | 01010 | P1 |
| 0001* | P2 | 1001* | P3 | 01011 | P1 |
| 1101* | P3 | 10000 | P3 | 10010 | P3 |
| 1110* | P6 | 00010 | P2 | 10011 | P3 |
| 00011 | P7 | 110* | P3 | 10000 | P3 |
| 00110 | P6 | 11101 | P6 | 00010 | P2 |
| 00111 | P4 | 00011 | P7 | 11000 | P3 |
| 01001 | P4 | 00110 | P6 | 11011 | P3 |
| 01101 | P2 | 00111 | P4 | 11101 | P6 |
| 01110 | P2 | 01001 | P4 | 00011 | P7 |
| 10001 | P5 | 011* | P2 | 00110 | P6 |
| 10011 | P3 | 10001 | P5 | 00111 | P4 |
| 10101 | P7 | 101* | P7 | 01001 | P4 |
| 11000 | P3 | 11100 | P8 | 01100 | P2 |
| 11100 | P8 | | | 01111 | P2 |
| | | | | 10001 | P5 |
| | | | | 10100 | P7 |
| | | | | 10111 | P7 |
| | | | | 11100 | P8 |

Due to the dual root partitioning, search depth is reduced. Although this advantage is lost to some extent in the implementation, the search performance in terms of throughput may still be increased considerably.

In binomial trees the number of children of a node is not fixed. Such general tree structures can be implemented in various ways, one of which is first-child-next-sibling (FCNS) representation. Even though there is an expansion in BT address table size (due to duplications), resulting binomial subtries have less number of trie nodes and links compared to the original binary trie.

Figure 9:
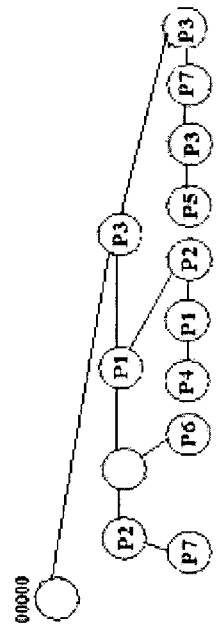
FIG. 9—illustrates FCNS representation of upper BT in FIG. 8.

3. Subtree Mapping: FCNS representation is used to implement a BT. Every node is linked with its rightmost child and its next (left nearest) sibling as shown in FIG. 9.

The number of nodes traversed during a search on a BT depends on the number of '1's in the node address whereas it depends on the number of bits between the first bit and the last set (reset) bit in FCNS representation of an upper (lower) BT. In order to counter balance the resulting longer FCNS path lengths, it is observed in this invention that one can skip the leading zeros of a search key if a third level of partitioning, which is called in this invention as BT clustering is introduced. BT clustering can be applied to both upper and lower BTs. In the following BT clustering will be discussed for upper BTs only. For lower BTs, one has to replace 'set bit' phrases with 'reset bit' and 'west' with 'north' side.

In BT clustering, the root node of a BT is removed and hence smaller disjoint BTs (clusters) arise (e.g. four clusters in partition 1 in FIG. 8). Root nodes of each cluster were previously in the second level of BT and each cluster is characterized such that most significant set bit in node addresses of cluster members are in the same position.

Upper BT clusters are then mapped to SAAFFIL-BT starting from west side and lower BT clusters from north side. There can be more BT clusters than the number of input stages. The mapping should be done in such a way that load balance at inputs will be achieved and at the same time input stage PE index and the root memory address of the corresponding cluster will be easy to compute before an IP lookup begins. One such strategy and its corresponding index and address formulas are given below:

r: initial stride
q: subtree id (decimal equivalent of initial r bits)
x: leftmost set bit position in remaining (32−r) bits
n: number of input stage PEs in west side
m: BT base index
w: input stage PE index
p: root memory address for upper BT clusters.

In total there are $2^r \times (32-r)$ cluster BTs. q is the group index due to initial partitioning. x is the BT cluster index and m is the input stage PE index for the first (x=0) cluster of a specific group q. Hence x is used as an offset from BT base index.

As an exception, the prefixes having all '0's or '1's in their remaining 24-bits (x.0.0.0 or x.255.255.255) should be stored in a small hash table of size 512 rows in SUs and lookup, for such IP addresses only, should be performed on these tables only.

Node to stage mapping is done simply by storing each cluster node in consecutive PEs. If the corresponding address bit is 0 then the next node is stored in the south neighbor PE, otherwise it is stored in the east. This node to stage mapping strategy is the same for both lower and upper BT clusters.

Routing table updates can be handled as in other existing pipelining architectures. For this requirement, a special 'update' packet may traverse the pipelines in a similar manner as in lookup but through an additional and specially designed logic unit added to PEs. Each route update may have several write messages. Finally, the corresponding PEs on a path issue 'write' commands to their associated memories [20]. The rest of the document does not consider the update issue any further for simplicity.

Lookup Process:

As in the previous subsection, for simplicity, IP lookup will be discussed for key values in upper BTs only. For lower BT key values, one has to replace 'set bit' phrases with 'reset bit' and 'west' with 'north' side in the following.

In the search process, the number of nodes traversed depends on the bits between the most and least significant set bits. IP lookup starts from an available (non-hold state) selector unit (SU). The SU specifies the input side as either west or north. Then it computes input stage PE index and the root memory address of the corresponding cluster using equations 1-4. In addition, it finds the maximum number of PE hops that the search key will traverse and initiates the search through the corresponding CR. CRs operate as described in subsection 3.4.

FIG. 10 illustrates the lookup process for an example IP address 103.54.192.0 on 16×16 SAAFFIL-BT.

With an initial stride of eight (due to initial partitioning), IP address 103.54.192.0 corresponds to upper BT cluster (due to dual root partitioning) because the number of zeros is greater than the number of ones in the remaining 24-bits. The bit position of the most and least significant set bit is 2 and 9, respectively. The input stage PE index is 9 and the root memory address of the corresponding cluster is 103. Finally, the maximum number of hops that the search can traverse is 9−2=7.

After finding the input stage PE, the search continues towards either east or south depending on the bit values between the $$m(q, n) = q \bmod n \quad (1)$$

$$w(q, x, n) = (m + x) \bmod n \quad (2)$$

$$k(r, n) = ((32 - r) + n)/n \quad (3)$$

$$p = \begin{cases} q & 0 \leq (m+x) < n \\ q + 2^r & n \leq (m+x) < 2n \\ q + 2^{r+1} & 2n \leq (m+x) < 3n \\ q + k \cdot 2^r & kn \leq (m+x) < (k+1)n \end{cases} \quad (4)$$

most and least significant set bits. If the corresponding bit is '1' then east neighbor is the next node, otherwise the south. FIG. 10 marks only the input stage PEs with row and column indices and the example search terminates at PE (11,5) assuming a valid prefix at this stage of the pipeline.

SAAFFIL-BT has a slightly modified PE logic unit such that the traversing frame includes an additional 5-bit hop counter, a single bit of packet type and the following functionality is implemented. The hop count value, which shows the number of PEs left for the packet to traverse, is decremented in each hop. The packet type indicates whether the packet belongs to an upper or lower BT cluster and this information is used to determine whether the port number field in a frame will be updated or not while visiting a node. The port number field is updated in a valid prefix node if the packet type is 0 (lower BT cluster) and the transition to the next node is towards east, or the packet type is 1 (upper BT cluster) and the transition to the next node is towards south. The last stage of the lookup is specified by longest matching rule. Unless a valid prefix is found in the last stage, the longest matching prefix is the one before the last 'one' (east-bound) transition and the port number is the last updated one. For instance in FIG. 10, the longest matching prefix would be the one in coordinates (11,4), if the prefix in the last stage (11,5) was not a valid one.

Selector Unit:

Selector unit is a combinational logic circuit that inputs the search key. There exists a path from each selector to each CR. The number of selector units, n, closely affects the performance of the SAAFFIL-BT because a maximum of n search requests can be allowed to the system per cycle. Selector unit for SAAFFIL-BT is more complex than for binary trie. SU implements the following functionality:

It specifies the input side (packet type) as either west or north, by comparing the number of ones and zeros in the remaining 24-bits of an IP address (FIG. 11 shows the block diagram of a logic circuit, which compares the number of ones and zeros in a 24-bit string).

It finds the input stage and the root memory address by using the bit position of the most significant set or reset bit of a key (FIG. 12 shows the block diagram of a logic circuit, which finds the bit position of the most significant set bit in a 24-bit binary number).

It calculates the maximum number of hops by using the bit position of least significant set or reset bit position in addition.

Figure 13:
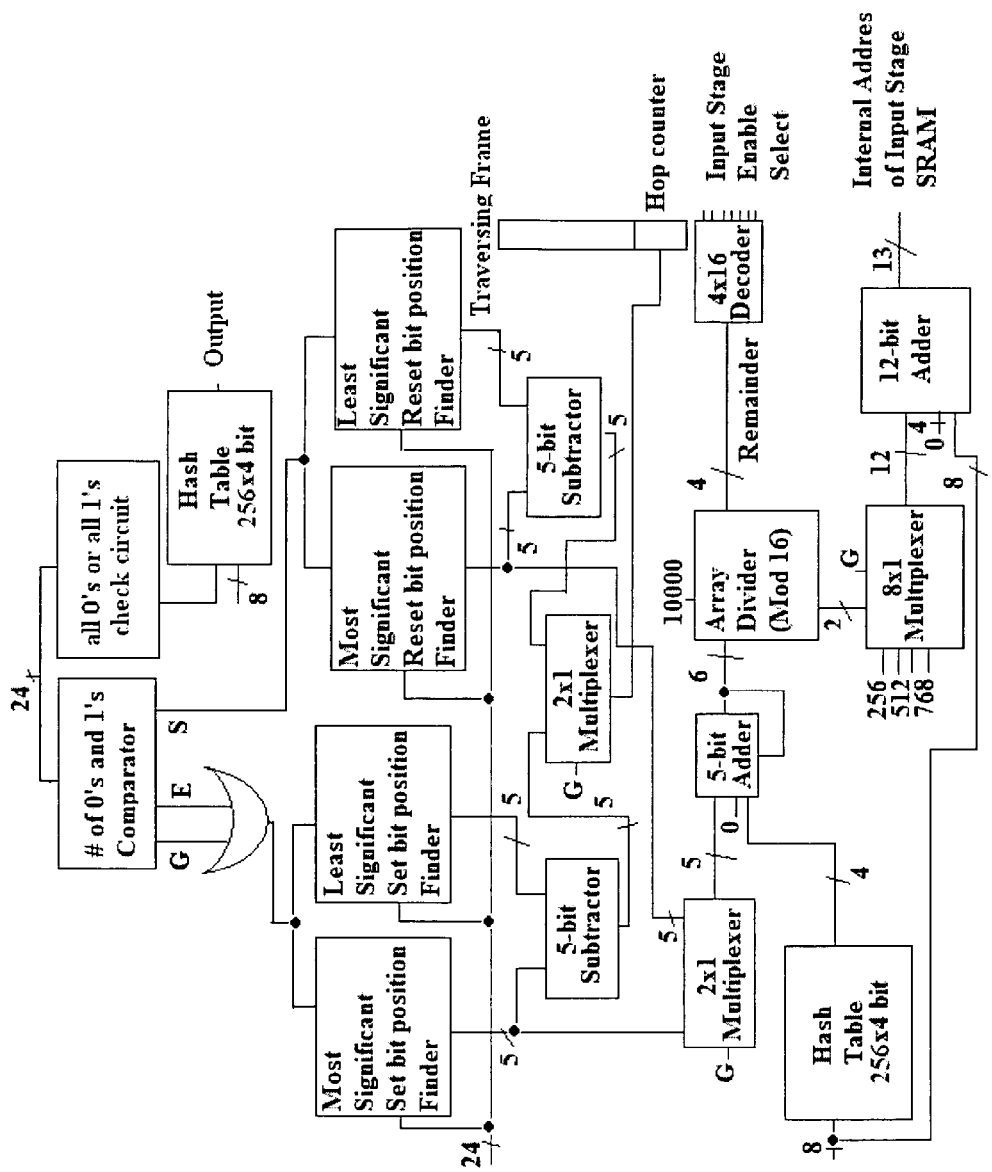
FIG. 13—illustrates the selector unit (SU) with r=8.

The overall block diagram of SU is given in FIG. 13.

Extensions of SAAFFIL-BT:

Cache Use:

Cache units are commonly used in parallel architectures for handling short term traffic bias. When the input traffic is biased to a few stages only (in burst periods), then parallelism decreases. Caching prevents performance degradation in such periods.

The parallel architectures in the literature (both TCAM and SRAM based ones) consider caching as part of their structures and it is demonstrated in [13], [16] that cache use increase their performance considerably. SAAFIL-BT on the other hand aims to have a higher performance without cache. However, it is still possible to extend it with a suitable caching scheme. Two alternatives may be employed as follows:

PPM (popular prefix matching) [13]: In this approach, small cache units (PPMs) are maintained in SUs and the most popular prefixes are stored in these units. An incoming packet is first searched in the cache. If a hit occurs, then the packet is forwarded directly to the backplane, otherwise a search process in the corresponding parallel architecture is initiated. Whenever two or more packets are forwarded to the same input stage, a contention occurs. This contention then triggers the process of prefix placement to the cache. This type of caching has several updating difficulties.

In binary trie implementations, time consuming computations are required in writing a parent prefix into a cache unit. An incoming IP address that matches with a child prefix also matches with its ascendant prefixes but the longest matching prefix has to be found. If an ascendant prefix exists in the cache, an IP address that matches with it may still have a longer match outside the cache. Therefore, ascendant prefixes cannot be written to cache units directly but the extensions of ascendant prefixes should be placed to the cache. This problem does not exist in BT implementation since all the node addresses have equal lengths and the whole IP address, instead of a prefix, can be cached (IP address caching).

In TCAM based parallel architectures, cache placement starts in the next cycle following a contention. In SRAM based parallel pipelining architectures, it takes longer to initiate the cache placement process because lookup result is retrieved after a while. If the pipeline length is longer than the burst length of a flow, all packets of the flow will have cache misses but the cache placements will be useless.

2. Flow pre-caching [22]: In this approach the IP address of a flow is cached before its port number information is retrieved. If an arriving packet matches a cached flow, corresponding flow ID is assigned to the packet and the packet traverses through the pipeline with minimum load without performing any operation. The port number is retrieved from an outbound flow table at the end.

If an arriving packet does not match any of the cached flows, it is directed to the selected input stage, lookup begins and the inbound flow table (flow cache) is updated using flow ID only. When a packet exits the pipeline, it writes the search result to the outbound flow table which will then be used by the rest of the flow.

If cache is not used, intra-flow packet order is preserved but cash use of any type obviously necessitates a suitable re-ordering mechanism.

Dual Input/Output SRAM Use:

One can also replace SRAMs in PEs in SAAFFIL-BT with dual input/output SRAMs allowing the processing of two keys at a time to increase the throughput. For this, only the logic unit in PEs should be modified while keeping the memory size of SRAMs unchanged.

Figure 14:
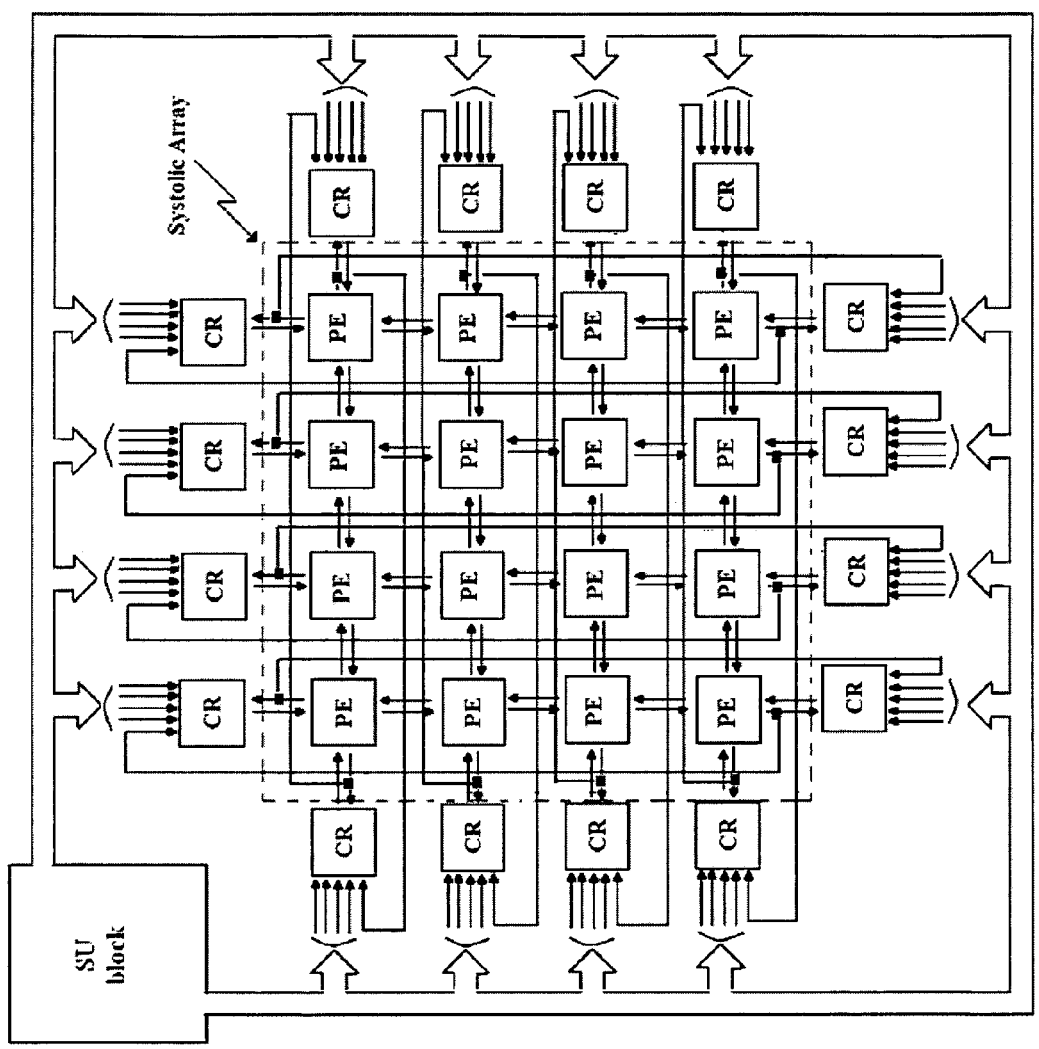
FIG. 14—illustrates four-side 4×4 SAAFFIL-BT.

Four-Side SAAFFIL-BT with Dual Input/Output SRAMs:

SAAFFIL-BT can also be extended so that it can have a four-side input boundary as illustrated in FIG. 14.

In this way, the number of input stage PEs doubles in return for a two fold increase in combinational logic. Bidirectional links between PEs are required in this extension. Each PE gets search requests from four neighbors, processes two at a time and forwards the traversing frame again to two of its four neighbors. From which queues the two traversing frames will be fetched depends on a suitable scheduling algorithm. In order to specify the search side as west (north) or east (south), the initial stride value can be used.

Three-Pointer Case:

Since the availability of PEs closely depends on the lengths of pipelines, having shorter pipelines is critical for SAAFFIL performance. In section 4.3 use FCNS representation was proposed to implement a BT. Even if it performs better than binary trie, FCNS causes BT to lose its shorter search path advantage to a certain extent. As an enhancement, using a three-pointer representation of BT is proposed in this invention instead. Despite minor modifications in combinational logic the memory size decreases in this extension and more benefit is obtained from dual root partitioning. FIG. 15 illustrates an example BT both with two and three-pointer representations.

Each child is assigned an id starting with zero from the rightmost child. s is the index of the child node that the third pointer points at. In other words, s shows the length of consecutive '0's to be skipped after the '1' bit in the prefix for upper BTs and the length of consecutive '1's to be skipped after the '0' bit for lower BTs. In FIG. 15c, s is two and therefore the third pointer points to the third child from the right.

In addition to shortening the pipeline lengths, three-pointer use also provides a reduction in the number of nodes or pointers. Table 2 gives the search path lengths of prefixes in FIG. 15 with two and three-pointer representations, separately.

TABLE 2

Search path length of prefixes for FIG. 15

| Prefix Table | | Two-pointer Rep. | | Three-pointer Rep. | |
|---|---|---|---|---|---|
| | | # of Hop | # of | # of Hop | # of |
| Next Hop | Prefix | without Partitioning | Hop with Partitioning | without Partitioning | Hop with Partitioning |
| P1 | 01000 | 2 | 2 | 2 | 2 |
| P3 | 10000 | 1 | 1 | 1 | 1 |
| P2 | 00010 | 4 | 4 | 2 | 2 |
| P3 | 11011 | 5 | 3 | 5 | 1 |
| P6 | 11101 | 5 | 4 | 5 | 2 |
| P7 | 00011 | 5 | 5 | 3 | 3 |
| P6 | 00110 | 4 | 4 | 2 | 2 |
| P4 | 00111 | 5 | 2 | 3 | 2 |
| P4 | 01001 | 5 | 5 | 3 | 3 |
| P5 | 01101 | 5 | 4 | 5 | 2 |
| P2 | 01110 | 4 | 5 | 4 | 3 |
| P5 | 10001 | 5 | 5 | 3 | 3 |
| P1 | 10011 | 5 | 2 | 3 | 3 |
| P7 | 10101 | 5 | 3 | 5 | 4 |
| P6 | 11000 | 2 | 2 | 2 | 2 |
| P8 | 11100 | 3 | 5 | 3 | 3 |
| P4 | 11001 | 5 | 4 | 3 | 2 |
| Total | | 70 | 60 | 54 | 40 |

For this example, three-pointer representation brings a reduction of approximately %23 (from 70 to 54) in total search path lengths. The table also illustrates increasing benefit of dual root partitioning if three-pointer representation is used. In two-pointer case, use of dual root partitioning decreases total prefix search length by approximately %14 (from 70 to 60) whereas in three-pointer case this reduction is %26 (from 54 to 40).

This extension does not increase SRAM size due to a need for extra pointer storage however it may affect the tree node distribution over memory units. Traversing frame size should be updated accordingly and a suitable logic should be designed in such a situation.

Simulation Results:

SAAFFIL-BT is simulated using Visual C++. Due to the unavailability of public IP traces associated with their corresponding routing tables, two methods were followed for generating IP packet traces to be used in the simulations of the invention. First, three packet traces were generated by using an available real life backbone routing table from [29]. These synthetically generated packet traces have uniformly distributed burst lengths in interval [1, k] where k is selected as 2, 5, and 10 for cases T1, T2 and T3, respectively. Second, the corresponding routing tables of real life backbone IP packet traces T4 and T5 from [30] were constructed by using real life prefix length distributions [29].

Simulations were performed for 16×16 SAAFFIL-BT having 32 selector units at most. As a CR strategy a simple priority based scheduling mechanism is used. The simulations are performed with and without cache. When employed, cache size is assumed to be 50. One may implement a cache with small CAM, hence the cache search can be assumed to be performed in a single clock cycle.

FIFO queue size and the threshold value for congestion control are selected as 30 and 10, respectively. The initial stride value is used as 8. In dual root partitioning, one can move the trie split level up or down to balance the number of prefixes in each partition. In simulations of the invention, this split level is selected as the $7^{th}$ level of BT for two-side SAAFFIL-BT and $5^{th}$ level of BT for four-side extension for T4 and T5. This split level is selected as the $3^{rd}$ level of BT for both two-side SAAFFIL-BT and its four-side extension for T1, T2 and T3 cases. In four-side SAAFFIL-BT, in specifying the search side as west (north) or east (south), the initial stride value was used as follows: if the decimal equivalent of initial stride value is higher than 100 for T1, T2 and T3 (85 for T4 and T5) than the search side is selected as ast, otherwise west. A round robin scheduler for selecting any of the two queues is used.

The routing table used in the simulations of the present invention is first applied to the MIPS algorithm [28] and disjoint prefixes are obtained first. By using MIPS, although not observed for synthetic traces, a compression of approximately %50 (a decrease from 280,339 to 135,712 prefixes) is achieved in real life backbone routing table example (T1, T2 and T3 cases). The BT based forwarding table is constructed from these disjoint prefixes and then it is mapped onto PEs.

Throughput: Table 3 presents the throughput (number of lookups performed in one cycle (also speedup)) of SAAFFIL-BT for some combinations of the proposed extensions for different packet traces.

TABLE 3

Throughput of SAAFFIL-BT

|  | T1 | T2 | T3 | T4 | T5 |
| --- | --- | --- | --- | --- | --- |
| SAAFFIL | 8.87 | 6.57 | 4.61 | 6.80 | 5.82 |
| SAAFFIL - c | 8.89 | 6.60 | 4.83 | 8.46 | 7.99 |
| SAAFFIL-BT | 8.95 | 6.56 | 4.66 | 7.83 | 7.12 |
| SAAFFIL-BT - c | 8.96 | 6.61 | 4.97 | 10.16 | 9.79 |
| SAAFFIL-BT - d | 17.66 | 14.07 | 10.07 | 16.04 | 14.42 |
| SAAFFIL-BT - c/d | 17.72 | 14.03 | 10.34 | 19.00 | 19.86 |
| SAAFFIL-BT - d/f | 23.60 | 19.64 | 13.08 | 19.38 | 16.19 |
| SAAFFIL-BT - c/d/f | 23.60 | 19.77 | 13.42 | 19.83 | 22.68 |
| SAAFFIL-BT - d/f/t | 29.95 | 21.40 | 14.17 | 20.95 | 16.44 |
| SAAFFIL-BT - c/d/f/t | 29.95 | 21.57 | 14.84 | 26.22 | 27.25 |

For comparison SAAFFIL throughput in corresponding test cases are also given. Illustrating the effect of all combinations of the proposed extensions requires an experiment design with excessive number of possibilities therefore Table 3 lists a selected group of combinations only. The results for with-and-without cache cases can be compared easily. It is observed that each individual extension is beneficial to a certain extent but by employing all, rather than a particular combination, a substantially high throughput figure of approximately 27 for real life traces can be achieved in this invention.

Conclusions such as the following are also possible: i) cache use is more beneficial for real traffic traces, i.e., T4 and T5, and ii) cache use is more beneficial for three pointer extension because this extension shortens the pipeline length and implicitly the time spent for retrieving the search result.

FIG. 16 illustrates, as an example, the instantaneous throughput fluctuation during the simulation of SAAFFIL-BT—d/f/t for T4 and SAAFFIL-BT—c/d/f/t for T5. Instantaneous throughput is defined as the average number of IP lookups calculated at every 10th cycle over a past window size of 10.

Instantaneous throughput does not fluctuate drastically but stays within a reasonable band of 10 after a transient period for T4. It fluctuates within a band of 20 for T5 but still not staying in low throughput state long. This figure can be used to calculate the required input buffer size in an overall router design effort and indicates that this buffer size need not be excessive.

Based on the simulations of the present invention, it is concluded that each of the 256 SRAM units should store fewer than 4K nodes for T1, T2 and T3 cases and fewer than 8K nodes for T4 and T5 cases, the reason for this difference being the application of MIPS algorithm to prefix tables. As was stated earlier, MIPS algorithm provides compression on real life backbone routing tables (T1, T2 and T3) while it expands the synthetically generated prefix tables corresponding to real packet traces (T4 and T5). For each node in the memory, 32 bits are stored (two 13-bit pointer fields, a 5-bit port number field and a valid bit). Therefore the total memory needed to store the whole routing table in SAAFIL-BT is $256 \times 2^{13} \times 32 = 65536$ Kbits=8 MB (for T4 and T5 cases). SRAM size in PEs is used in determining the system clock frequency as follows:

The clock rate of the overall system depends on the memory access times. Table 4 lists the SRAM access times for different sizes and for different VLSI technologies, which are estimates obtained using the CACTI tool [31]. The larger the memory, the longer is the access time. In SAAFFIL-BT, a single clock cycle includes one FIFO queue read/write and one SRAM read operation, therefore, clock cycle duration can be chosen to be approximately 1.2 ns using 65 nm SRAM technology (assuming a FIFO queue size of 64 rows and SRAM size of 8192 rows). It is observed, from Table 3, that the speedup for real traces is approximately 8 in SAAFFIL—c hence it is concluded that SAAFFIL may process 6.67 billion packets per second, i.e., corresponding to a router front end speed of approximately 2 Tbps assuming 40 byte IP packets. For SAAFFIL-BT employing all of the proposed extensions, the throughput reaches to approximately 27. Assuming that the access times of a simple SRAM and a dual input/output SRAM are equal, SAAFFIL-BT now achieves a router front end speed of approximately 7 Tbps.

TABLE 4

SRAM access time estimates in nano second

| No of rows | 65 nm | 45 nm | 32 nm |
|---|---|---|---|
| 32 | 0.4723 | 0.2701 | 0.1873 |
| 64 | 0.4895 | 0.2804 | 0.1945 |
| 128 | 0.5143 | 0.2952 | 0.2050 |
| 256 | 0.5460 | 0.2956 | 0.2205 |
| 512 | 0.5845 | 0.3388 | 0.2393 |
| 1024 | 0.6095 | 0.3471 | 0.2552 |
| 2048 | 0.6267 | 0.3666 | 0.2604 |
| 4096 | 0.6839 | 0.4067 | 0.2921 |
| 8192 | 0.8311 | 0.4992 | 0.3623 |

Delay statistics: Table 5 presents the average lookup delay for SAAFFIL, SAAFFIL-BT and its possible extensions in a similar manner to throughput results given in Table 3.

TABLE 5

Average lookup delay of SAAFFIL-BT in clock cycles

| | T1 | T2 | T3 | T4 | T5 |
|---|---|---|---|---|---|
| SAAFFIL | 14.87 | 15.50 | 16.47 | 14.17 | 14.42 |
| SAAFFIL - c | 14.84 | 15.42 | 15.87 | 11.87 | 12.06 |
| SAAFFIL-BT | 12.10 | 12.82 | 13.88 | 11.25 | 11.75 |
| SAAFFIL-BT - c | 12.09 | 12.74 | 13.09 | 9.50 | 9.65 |
| SAAFFIL-BT - d | 10.37 | 10.23 | 10.62 | 8.81 | 9.11 |
| SAAFFIL-BT - c/d | 10.37 | 10.20 | 10.49 | 8.08 | 8.04 |
| SAAFFIL-BT - d/f | 9.38 | 9.47 | 9.96 | 9.24 | 9.10 |
| SAAFFIL-BT - c/d/f | 9.37 | 9.46 | 9.84 | 8.67 | 8.11 |
| SAAFFIL-BT - d/f/t | 5.35 | 6.02 | 6.81 | 6.94 | 7.08 |
| SAAFFIL-BT - c/d/f/t | 5.35 | 6.01 | 6.61 | 6.54 | 5.91 |

It is observed that each individual extension is beneficial in decreasing the average delay to a certain extent but by employing all, rather than a particular combination, a lower average delay figure of approximately 6 for real life traces can be achieved. Conclusions similar to the ones in throughput subsection are also possible.

FIG. 17 depicts, as an example, the lookup delay histogram obtained during the simulation of the real traces T4 and T5. Although the theoretical worst-case lookup delay, i.e., FIFO queue size in each PE×number of IP bits used throughout the search, is high for the proposed architecture, average delay is found to be rather low. Lookup delay is between 2 to 50 clock cycles with very few packets being subject to delays that are larger than 20 and the average delay is approximately 6 in this case. The basic architecture SAAFFIL also shows a similar characteristic but with an average delay of approximately 14 cycles demonstrating that SAAFIL-BT and its extensions are quite effective not only in increasing the throughput of the base architecture SAAFFIL, but also in decreasing the average lookup delay.

Overall comparison: Table 6 compares extended SAAF-FIL-BT with other parallel solutions proposed earlier in the literature. The data either corresponds to the best reported value in the respective paper or is a calculated value if such a best is not reported, the calculation being based on a suitable cycle time assumption. Table 6 shows that SAAFFIL-BT takes the lead among existing IP lookup approaches with a substantially safe margin.

TABLE 6

Comparison with existing parallel architectures

| | Throughput (lookup per cycle) | Delay (cycles) | Cycle Time (ns) | Speed (Tbps) |
|---|---|---|---|---|
| TCAM [13] | 8.5 | — | — | 0.224 |
| Baboescu et al. [14] | 0.5 | 16 | 3 | 0.053 |
| CAMP [15] | 0.8 | — | — | 0.160 |
| POLP [16] | 8 | 25 | 2.5 | 1 |
| SAAFFIL | 8 | 12 | 1.2 | 2 |
| SAAFFIL-BT * | 27 | 6 | 1.2 | 7 |

Trie node distribution over memory units: The number of trie nodes stored in SRAM block of each PE is illustrated in FIG. 18a, as an example, for SAAFFIL-BT—c/d/f/t for T5. x and y axis indicate PE indices and taxis shows the number of total BT nodes stored in the corresponding memory unit. It is observed that the distribution can be regarded as acceptably balanced noting that no extra effort has been paid for balancing. By trial and error, better throughput and delay performance is obtained by assigning no cluster root nodes at corner PEs during mapping.

Search load distribution: FIG. 18b illustrates the total number of search operations in SRAM block of each PE, as an example, for SAAFFIL-BT—c/d/f/t for T5. It is observed that the load on PEs are acceptably balanced over all PEs.

Figures 19A, 19B:
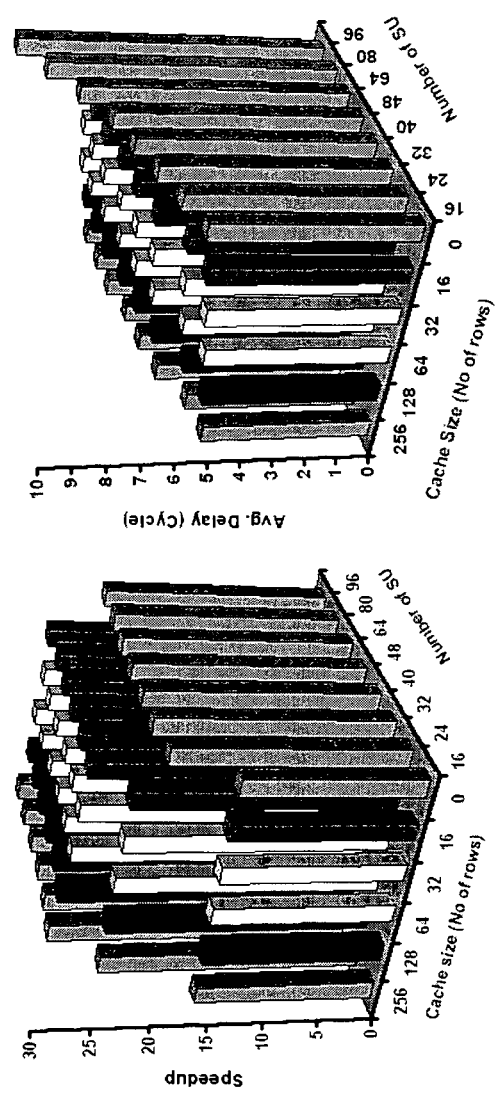
FIG. 19A—illustrates the speedup vs cache size and number of SUs for SAAFFIL-BT—c/d/f/t for T4.
FIG. 19B—illustrates the average delay vs cache size and number of SUs for SAAFFIL-BT—c/d/f/t for T4.

Number of SUs and cache size optimization: FIG. 19 depicts the average throughput and average delay versus cache size versus number of SUs for SAAFFIL-BT—c/d/f/t for T4. The following conclusions are possible: (i) throughput does not change for SU>32 (ii) cache use is effective in increasing the throughput but is increasing cache size above 16 does not change the throughput (iii) average delay increases with increasing number of SUs (iv) increasing cache size decreases the average delay slightly (v) number of SUs=32 and cache size=50 seems reasonable choices.

References:

[1] M. A. R. Sanchez, E. W. Biersack, and W. Dabbous, "Survey and Taxonomy of IP Address Lookup Algorithms," *IEEE Network*, vol. 15, pp. 8-23, 2001.

[2] H. J. Chao, "Next Generation Routers," *Proc. of IEEE*, vol. 90, pp. 1518-1558, 2002.

[3] M. J. Akhbarizadeh, M. Nourani, and C. D. Cantrell, "Prefix Segregation Scheme for a TCAM Based IP Forwarding Engine," *IEEE Micro*, vol.25, pp. 48-63, August 2005.

[4] A. J. McAuley and P. Francis, "Fast Routing Table Lookup Using CAMs," *Proc. of IEEE INFOCOM '93*, vol. 3, pp. 1382-1391, April 1993.

[5] M. Kobayashi, T. Murase, and A. Kuriyama, "A Longest Prefix Match Search Engine for Multi-gigabit IP Processing," *Proc. of IEEE International Conference on Communications*, vol. 3, pp. 1360-1364, June 2000.

[6] V. C. Ravikumar, R. N. Mahapatra, and L. N. Bhuyan, "Ease CAM: An Energy and Storage Efficient TCAM-based Router Architecture for IP Lookup," *IEEE Transactions on Computers*, vol. 54, pp. 521-533, 2005.

[7] D. Shah and P. Gupta, "Fast Updating Algorithms for TCAMs," *IEEE Micro*, pp. 37-47, January-February 2001.

[8] K. Pagiamtzis and A. Sheikholeslami, "Content-addressable Memory (CAM) Circuits and Architectures: A Tutorial and Survey," *IEEE Journal of Solid-State Circuits*, vol. 41, pp. 712-727, March 2006.

[9] F. Zane, G. Narlikar, and A. Basu, "CoolCAMs: Power Efficient TCAMs for Forwarding Engines," *Proc. of IEEE INFOCOM '03*, vol.1, pp. 42-52, March 2003.

[10] R. Panigrahy and S. Sharma, "Reducing TCAM Power Consumption and Increasing Throughput," *Proc. of 10th IEEE Symp. High-Performance Interconnects (HOTI 02)*, pp. 107-112, 2002.

[11] R. V. C. Rabi and N. Mahapatra, "TCAM Architecture for IP Lookup Using Prefix Properties," *IEEE Micro*, vol. 24, pp. 60-68, April 2004.

[12] C. S. Lin, J. C. Chang, and B. D. Liu, "Design for Low-power, Low-cost and High-reliability Precomputation-based Content-Addressable Memory," *Proc. of Asia-Pacific Conf. Circuits Systems*, vol. 2, pp. 319-324, 2002.

[13] M. J. Akhbarizadeh, M. Nourani, R. Panigrahy, and S. Sharma, "A TCAM-based Parallel Architecture for High-speed Packet Forwarding," *IEEE Trans. Computers*, vol. 56, no. 1, pp. 58-72, 2007.

[14] F. Baboescu, D. M. Tullsen, G. Rosu, and S. Singh, "A Tree Based Router Search Engine Architecture with Single Port Memories," *Proc. of ISCA '05*, pp. 123-133, 2005.

[15] S. Kumar, M. Becchi, P. Crowley, and J. Turner, "Camp: Fast and Efficient IP Lookup Architecture," *Proc. of ANCS'06*, pp. 51-60, 2006.

[16] W. Jiang, Q. Wang, and V. K. Prasanna, "Beyond TCAMs: An SRAM-based Parallel Multi-pipeline Architecture for Terabit IP Lookup" *Proc. of IEEE INFOCOM'08*, pp. 2458-2466, 2008.

[17] W. Jiang and V. K. Prasanna, "Multi-terabit IP Lookup Using Parallel Bidirectinal Pipelines" *Proc. of Computing Frontiers*, pp. 241-250, 2008.

[18]

[19] J. Hasan and T. N. Vijaykumar, "Dynamic Pipelining: Making IP Lookup Truly Scalable", *Proc. of ACM SIGCOMM'05*, pp. 205-216, 2005.

[20] A. Basu and G. Narlikar, "Fast Incremental Updates for Pipelined Forwarding Engines," *Proc. of INFOCOM'03*, vol. 1, pp. 64-74, 2003.

[21] W. Jiang and V. K. Prasanna, "A Memory-balanced Linear Pipeline Architecture for Trie-based IP Lookup", *Proc. of IEEE HOTI'07*, pp. 83-90, August 2007.

[22] W. Jiang and V. K. Prasanna, "Parallel IP Lookup Using Multiple SRAM Based Pipelines," *Proc. of IEEE IPDPS'08*, pp. 1-14, April 2008.

[23] H. Le, W. Jiang, and V. K. Prasanna, "Scalable High Throughput SRAM-based Architecture for IP Lookup Using FPGA", *Proc. of FPL '08*, pp. 137-142, September 2008.

[24] W. Jiang and V. K. Prasanna, "Multi-way Pipelining for Power Efficient IP Lookup," *Proc. of IEEE GLOBECOM'08*, pp. 1-5, December 2008.

[25] W. Jiang and V. K. Prasanna, "Towards Green Routers: Depth Bounded Multi Pipeline Architecture for Power Efficient IP Lookup", *Proc. of IPCCC'08*, pp. 185-192, December 2008.

[26] Y. K. Chang, "Simple and Fast IP Lookups Using Binomial Spanning Trees," *Computer Communications*, vol. 28, pp. 529-539, 2005.

[27] G. Wang and N. F. Tzeng, "TCAM-based Forwarding Engine with Minimum Independent Prefix Set (MIPS) for Fast Updating," Proc. of IEEE ICC'06, vol. 1, pp. 103-109, June 2006.

[28] O. Erdem and C. F. Bazlamaçci, "MIPS Extension for a TCAM Based Parallel Architecture for Fast IP Lookup", Proc. of 24th Int. Symp. on Computer and Information Sciences (ISCIS'09), pp. 310-315, September 2009.

[29] "BGP Routing Table Analysis Reports" http://bgp.potaroo.net, 2007.

[30] "AMPATH-I Traces" http://pma.nlanr.net

[31] P. Shivakumar and N. Jouppi, "Cacti Tool" http://quid.hpl.hp.com:9081/cacti/

The invention claimed is:

1. An Internet Protocol (IP) lookup engine for use in a router receiving data packets from a network, the router having a plurality of input ports and output ports, each data packet having a header and a body, comprising:
    a specially designed systolic array processing element (PE) composed of an SRAM, a FIFO queue and an associated peripheral logic circuitry;
    a two dimensional and circular organization of PEs in the form of $\sqrt{nm} \times \sqrt{nm}$ for constructing a plurality of intersecting parallel pipelines of different length for processing the header of each of the data packets to determine to which output port the data packets should be routed;
    a plurality of selector units (SUs) and a plurality of contention resolvers (CRs) in front of input stages of the systolic array; and
    a congestion control unit for activating and deactivating the plurality of selector units (SUs) to adjust input traffic rate;
    wherein the plurality of intersecting parallel pipelines form a plurality of nodes at a plurality of intersection locations.

2. The Internet Protocol (IP) lookup engine of claim 1, wherein the plurality of nodes traversed during the search depends on the bits between the most significant set bit position and the least significant set bit position in the search key (IP address).

3. The Internet Protocol (IP) lookup engine of claim 2, wherein the plurality of nodes are divided into two groups, one group containing nodes that have greater number of zero bits in their addresses and the other group containing the nodes that have greater number of one bits in their addresses, both partitions being represented as separate but similar binomial tries with approximately half the original depth, with root node address being all zeros in one partition and all ones in the other partition, thereby reducing the average path length of the trie representation.

4. The Internet Protocol (IP) lookup engine of claim 2, wherein upper BT clustering, where the preceding zeros of prefixes are removed, which corresponds to partitioning the upper part of the binomial trie into multiple clusters based on the number of preceding zeros that are removed, where the number of removed preceding zeros is used as the cluster index; and
    wherein lower BT clustering, where the preceding ones are removed from prefixes and multiple clusters are obtained using the number of preceding ones that are removed, where the number of deleted preceding ones is used as cluster index thereby reducing the average path length of the trie representation.

5. The Internet Protocol (IP) lookup engine of claim 4, wherein while computing index for storing root of a subtrie onto a corresponding PE a left child node of each trie node is stored in south neighboring PE, a right Child node of each trie node is stored in east neighboring PE, and long subrie paths are stored by using wrap-around connection.

* * * * *